(12) United States Patent
Freeman et al.

(10) Patent No.: US 11,499,444 B1
(45) Date of Patent: Nov. 15, 2022

(54) TURBINE SHROUD ASSEMBLY WITH FORWARD AND AFT PIN SHROUD ATTACHMENT

(71) Applicant: Rolls-Royce Corporation, Indianapolis, IN (US)

(72) Inventors: Ted J. Freeman, Danville, IN (US); Aaron D. Sippel, Zionsville, IN (US); David J. Thomas, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/351,471

(22) Filed: Jun. 18, 2021

(51) Int. Cl.
F01D 11/08 (2006.01)

(52) U.S. Cl.
CPC .......... F01D 11/08 (2013.01); *F05D 2220/32* (2013.01); *F05D 2240/11* (2013.01)

(58) Field of Classification Search
CPC ...... F01D 11/003; F01D 11/02; F01D 11/025; F01D 11/08; F01D 11/12; F01D 11/122; F01D 25/246; F05D 2220/32; F05D 2240/11; F05D 2230/60
See application file for complete search history.

(56) References Cited

U.S. PATENT DOCUMENTS

| | | | |
|---|---|---|---|
| 3,066,911 A | 12/1962 | Anderson et al. | |
| 4,676,715 A | 6/1987 | Imbault et al. | |
| 5,203,673 A | 4/1993 | Evans | |
| 5,295,787 A | 3/1994 | Leonard et al. | |
| 5,405,245 A | 4/1995 | Cornelius | |
| 5,459,995 A | 10/1995 | Norton et al. | |
| 6,821,085 B2 | 11/2004 | Darkins, Jr. et al. | |
| 6,877,952 B2 | 4/2005 | Wilson | |
| 6,884,026 B2 | 4/2005 | Glynn et al. | |
| 7,210,899 B2 | 5/2007 | Wilson | |
| 7,416,362 B2 | 8/2008 | North | |
| 7,494,317 B2 | 2/2009 | Keller et al. | |
| 7,534,086 B2 | 5/2009 | Mazzola et al. | |
| 8,944,756 B2 | 2/2015 | Lagueux | |
| 9,587,517 B2 | 3/2017 | Vetters et al. | |
| 9,598,975 B2 | 3/2017 | Uskert et al. | |
| 9,863,265 B2 | 1/2018 | Stapleton | |
| 9,874,104 B2 | 1/2018 | Shapiro | |
| 9,926,801 B2 | 3/2018 | Uskert et al. | |
| 10,030,541 B2 | 7/2018 | Vetters et al. | |
| 10,215,056 B2 | 2/2019 | Sippel et al. | |
| 10,301,960 B2 | 5/2019 | Stapleton et al. | |

(Continued)

FOREIGN PATENT DOCUMENTS

EP 3043032 A1 7/2016
EP 3178799 A1 6/2017

OTHER PUBLICATIONS

Extended EP Search Report completed by the European Searching Authority dated Sep. 9, 2022 and issued in connection with European Patent Appln. No. 22169263.5, 9 pages.

*Primary Examiner* — Igor Kershteyn
(74) *Attorney, Agent, or Firm* — Barnes & Thornburg LLP

(57) ABSTRACT

A turbine shroud assembly adapted for use with a gas turbine engine includes a carrier, a seal segment, and a mount assembly. The carrier is configured to be coupled to a turbine case. The seal segment is shaped to define a gas path boundary of the shroud assembly. The mounting assembly is configured to couple the seal segment to the carrier.

20 Claims, 19 Drawing Sheets

(56) References Cited

U.S. PATENT DOCUMENTS

| | | | |
|---|---|---|---|
| 10,316,687 B2 | 6/2019 | Uskert et al. | |
| 10,378,385 B2 | 8/2019 | Tesson et al. | |
| 10,378,386 B2 | 8/2019 | Roussille et al. | |
| 10,544,704 B2 | 1/2020 | Groleau et al. | |
| 10,590,803 B2 | 3/2020 | Quennehen et al. | |
| 10,619,514 B2 | 4/2020 | Walston et al. | |
| 10,619,517 B2 | 4/2020 | Quennehen et al. | |
| 10,655,501 B2 | 5/2020 | Lepretre et al. | |
| 10,690,007 B2 | 6/2020 | Quennehen et al. | |
| 10,774,008 B2 | 9/2020 | Subramanian et al. | |
| 10,815,810 B2 | 10/2020 | Barker | |
| 10,858,959 B2 | 12/2020 | Maar | |
| 10,995,627 B2* | 5/2021 | Rice | F01D 11/08 |
| 11,111,796 B1* | 9/2021 | Freeman | F01D 25/28 |
| 11,215,080 B1* | 1/2022 | Freeman | F01D 25/243 |
| 11,319,828 B1* | 5/2022 | Freeman | F01D 11/08 |
| 2010/0104426 A1 | 4/2010 | Keller et al. | |
| 2014/0271147 A1* | 9/2014 | Uskert | F01D 11/22 |
| | | | 415/173.2 |
| 2016/0186611 A1* | 6/2016 | Vetters | F01D 11/08 |
| | | | 415/173.2 |
| 2018/0195403 A1 | 7/2018 | Kerns et al. | |
| 2019/0040758 A1 | 2/2019 | Quennehen et al. | |
| 2019/0040761 A1 | 2/2019 | Carlin et al. | |
| 2019/0128132 A1 | 5/2019 | Tableau et al. | |
| 2019/0264578 A1* | 8/2019 | Walston | F01D 11/08 |
| 2020/0256215 A1 | 8/2020 | Walston et al. | |
| 2021/0054760 A1* | 2/2021 | Walston | F01D 25/246 |
| 2021/0164365 A1 | 6/2021 | Starr et al. | |
| 2021/0189897 A1 | 6/2021 | Sippel et al. | |
| 2021/0189909 A1 | 6/2021 | Sippel et al. | |
| 2021/0355835 A1* | 11/2021 | Freeman | F01D 25/246 |

\* cited by examiner

TURBINE SHROUD ASSEMBLY WITH FORWARD AND AFT PIN SHROUD ATTACHMENT

FIELD OF THE DISCLOSURE

The present disclosure relates generally to gas turbine engines, and more specifically to turbine shroud assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to high temperatures. In some examples, coupling these components with traditional fasteners may not allow for the differing levels of expansion and contraction during operation of the gas turbine engine.

SUMMARY

The present disclosure may comprise one or more of the following features and combinations thereof.

A turbine shroud assembly adapted for use with a gas turbine engine may include a carrier, a seal segment comprising ceramic matrix composite materials, a mount assembly. The mount assembly may be configured to couple the seal segment with the carrier.

In some embodiments, the carrier may be shaped to include an outer wall, a forward support wall, an aft support wall, and a central support wall. The aft support wall may be spaced axially from the forward support wall. The central support wall may be located between the forward support wall and the aft support.

In some embodiments, the seal segment may be shaped to include a runner, a forward mount flange, and an aft mount flange. The runner may extend circumferentially partway around an axis. The forward mount flange may extend from the runner into a forward space between the forward support wall and the central support wall of the carrier. The aft mount flange may extend from the runner into an aft space between the aft support wall and the central support wall of the carrier.

In some embodiments, the mount assembly may include a forward pin and an aft pin circumferentially aligned with and aft of the forward pin. The forward pin may extend axially through the forward mount flange of the seal segment into both the forward support wall and the central support wall of the carrier. The aft pin may extend axially through the aft mount flange of the seal segment into both the aft support wall and the central support wall of the carrier.

In some embodiments, the forward pin and the aft pin may be spaced axially apart from one another by at least a portion of the central support wall. The forward and aft pins may be separate from each other so as to allow for independent movement of the forward pin and the aft pin.

In some embodiments, the forward support wall may be formed to include a forward axially-extending installation aperture. The forward axially-extending installation aperture may receive a portion of the forward pin.

Inn some embodiments, the aft support wall may be formed to include an aft axially-extending installation aperture. The aft axially-extending installation aperture may receive a portion of the aft pin.

In some embodiments, the mount assembly may include a forward retainer plug and an aft retainer plug. The forward retainer plug may be configured to block removal of the forward pin through the forward axially-extending installation aperture. The aft retainer plug may be configured to block removal of the aft pin through the aft axially-extending installation aperture.

In some embodiments, the central support wall may be formed to include a forward blind support hole and an aft blind support hole. The forward blind support hole may receive another portion of the forward pin. The aft blind support hole may receive another portion of the aft pin.

In some embodiments, the mount assembly may further include a forward retainer plug and an aft retainer plug. The forward retainer plug may be configured to block removal of the forward pin out of the carrier. The aft retainer plug may be configured to block removal of the aft pin out of the carrier.

According to another aspect of the present disclosure, a turbine shroud assembly adapted for use with a gas turbine engine may include a carrier, a seal segment comprising ceramic matrix composite materials, and a mounting assembly. The carrier may be shaped to include an outer wall, a forward support wall, an aft support wall spaced axially from the forward support wall, and a central support wall located between the forward support wall and the aft support. The seal segment may be shaped to include a runner that extends circumferentially partway around an axis, a forward mount flange that extends from the runner into a forward space between the forward support wall and the central support wall of the carrier, and an aft mount flange that extends from the runner into an aft space between the aft support wall and the central support wall of the carrier.

In some embodiments, the mount assembly may include a forward pin and an aft pin. The forward pin may extend axially through the forward mount flange of the seal segment into both the forward support wall and the central support wall of the carrier. The aft pin may extend axially through the aft mount flange of the seal segment into both the aft support wall and the central support wall of the carrier.

In some embodiments, the forward pin and the aft pin may be spaced axially apart from one another by at least a portion of the central support wall. In some embodiments, the forward pin may be located forward of the aft pin at the same circumferential and radial location relative to the axis so as to provide a split-pin assembly. The split-pin assembly may extend through both the forward mount flange and the aft mount flange of the seal segment.

In some embodiments, the forward support wall may be formed to include a forward axially-extending installation aperture. The forward axially-extending installation aperture may receive a portion of the forward pin.

In some embodiments, the aft support wall may be formed to include an aft axially-extending installation aperture. The aft axially-extending installation aperture may receive a portion of the aft pin.

In some embodiments, the mount assembly may include a forward retainer plug and an aft retainer plug. The forward retainer plug may be configured to block removal of the forward pin through the forward axially-extending installation aperture. The aft retainer plug may be configured to block removal of the aft pin through the aft axially-extending installation aperture.

In some embodiments, the central support wall may be formed to include a forward blind support hole and an aft blind support hole. The forward blind support hole may receive another portion of the forward pin. The aft blind support hole may receive another portion of the aft pin.

In some embodiments, the central support wall may be formed to include a forward blind support hole and an aft blind support hole. The forward blind support hole may receive another portion of the forward pin. The aft blind support hole may receive another portion of the aft pin.

In some embodiments, the mount assembly may include a forward retainer plug and an aft retainer plug. The forward retainer plug may be configured to block removal of the forward pin out of the carrier. The aft retainer plug may be configured to block removal of the aft pin out of the carrier.

According to another aspect of the present disclosure, a method may include providing a carrier, a seal segment, and a mount assembly. The carrier may include an outer wall that extends circumferentially at least partway about an axis, a forward support wall that extends radially inward from the outer wall, an aft support wall spaced axially from the forward support wall that extends radially inwardly from the outer wall, and a central support wall located axially between the forward support wall and the aft support wall that extends radially inwardly from the outer wall. The seal segment may include a runner that extends circumferentially partway around an axis, a forward mount flange that extends radially outward from the runner, and an aft mount flange that extends radially outward from the runner. The mount assembly may include a forward pin and an aft pin.

In some embodiments, the method further include locating the seal segment adjacent to the carrier. The seal segment may be located adjacent to the carrier so that the forward mount flange is between the forward support wall and the central support wall of the carrier. The seal segment may be located adjacent to the carrier so that the aft mount flange that extends is between the aft support wall and the central support wall of the carrier.

In some embodiments, the method may further include coupling the seal segment with the carrier with the first split-pin fastener. The seal segment may be coupled with the carrier by inserting the forward pin of the first split-pin fastener through the forward support wall of the carrier and the forward mount flange of the seal segment into the central support wall of the carrier. The seal segment may be coupled with the carrier by inserting the aft pin of the first split-pin fastener through the aft support wall of the carrier and the aft mount flange of the seal segment into the central support wall of the carrier.

In some embodiments, the forward pin and the aft pin may be spaced axially apart from one another. The forward and aft pins may be spaced axially apart from one another by at least a portion of the central support wall.

In some embodiments, the forward support wall may be formed to include a forward axially-extending installation aperture. The forward axially-extending installation aperture may receive a portion of the forward pin.

In some embodiments, the aft support wall may be formed to include an aft axially-extending installation aperture. The aft axially-extending installation aperture may receive a portion of the aft pin.

In some embodiments, the mount assembly include a forward retainer plug and an aft retainer plug. The method may further include inserting the forward retainer plug into the forward axially-extending installation aperture to block removal of the forward pin. The method may further include inserting the aft retainer plug into the aft axially-extending installation aperture to block removal of the aft pin.

In some embodiments, the central support wall may be formed to include a forward blind support hole and an aft blind support hole. The forward support blind hole may receive another portion of the forward pin. The aft blind support hole may receive another portion of the aft pin.

In some embodiments, the mount assembly may include a forward retainer plug and an aft retainer plug. The method may further include inserting the forward retainer plug into the forward support wall of the carrier to block removal of the forward pin and inserting the aft retainer plug into the aft support wall to block removal of the aft pin.

These and other features of the present disclosure will become more apparent from the following description of the illustrative embodiments.

DETAILED DESCRIPTION OF THE DRAWINGS

Figure 1:
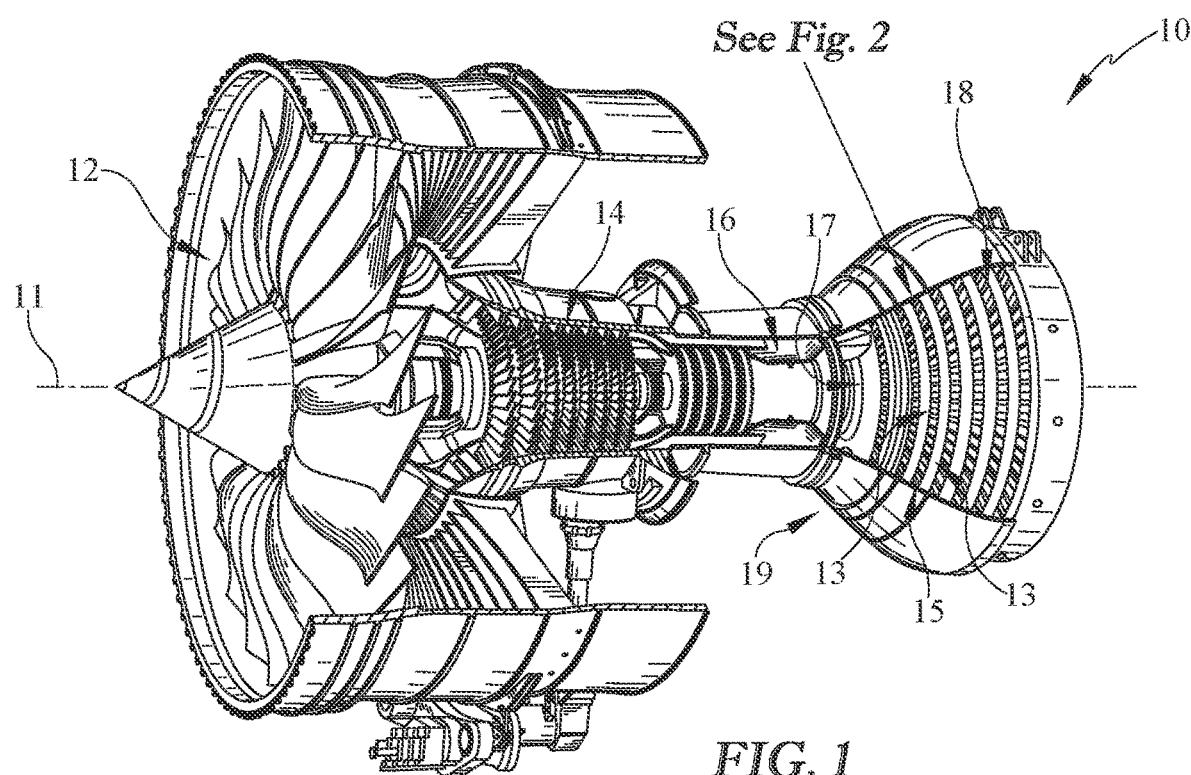
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

A turbine shroud segment 22 adapted for use with a gas turbine engine 10 is shown in FIGS. 2-6. The turbine shroud segment 22 includes a carrier 24, a seal segment 26, and a mount assembly 28 configured to couple the seal segment 26 to the carrier 24. The carrier 24 is configured to be coupled to a turbine case 19 of the gas turbine engine 10. The seal segment 26 defines a gas path 21 boundary of the gas turbine engine 10. The mount assembly 28 includes a first split-pin fastener 30 and a second split-pin fastener 32 that cooperate to couple the seal segment 26 with the carrier 24 to support the seal segment 26 radially relative to an axis 11 of the gas turbine engine 10.

Figure 4:
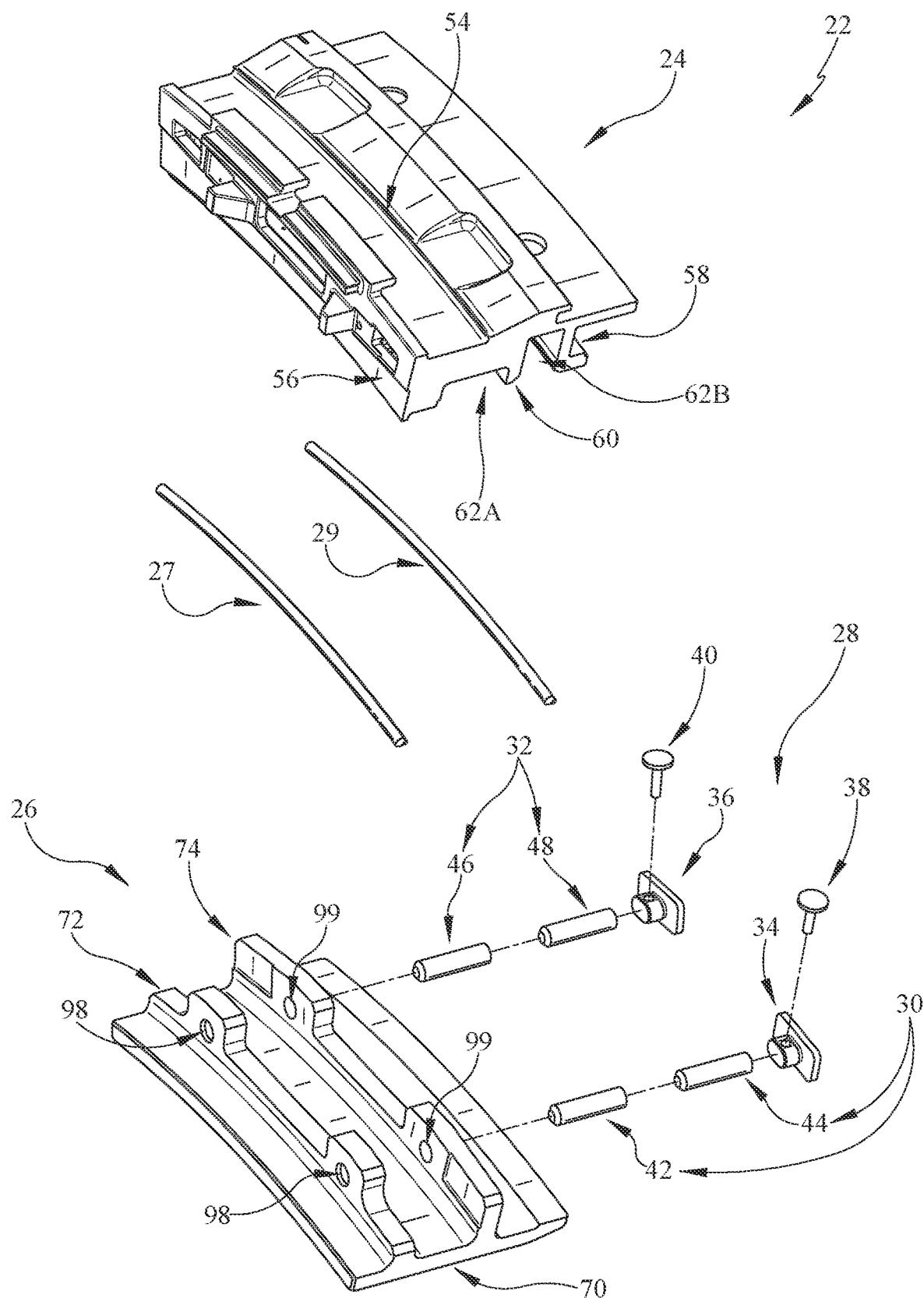
FIG. 4 is an exploded view of the turbine shroud assembly of FIG. 3 showing, from top to bottom, the carrier, the mounting assembly including a first split-pin fastener, a second split-pin fastener spaced apart circumferentially from the first split-pin fastener, and first and second retainer plugs configured to block removal of the corresponding split-pin fastener, and the seal segment.
Figure 5:
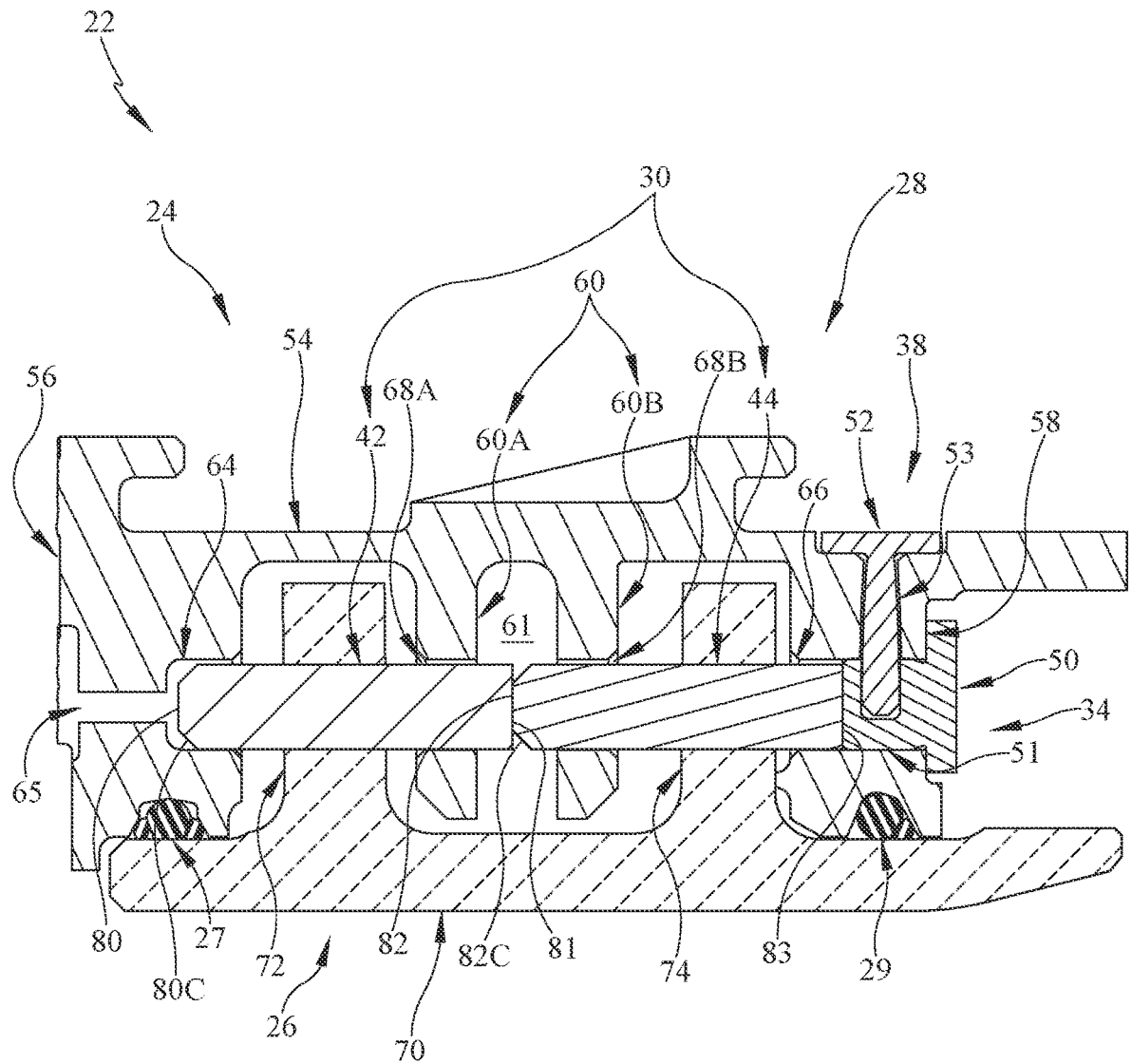
FIG. 5 is a detail cross-section view of the turbine shroud assembly of FIG. 2 showing each split-pin fastener is made up of a forward pin that extends axially through a forward mount flange of the seal segment into the carrier and an aft pin circumferentially aligned with and aft of the forward pin that extends axially through an aft mount flange of the seal segment into the carrier.
Figure 6:
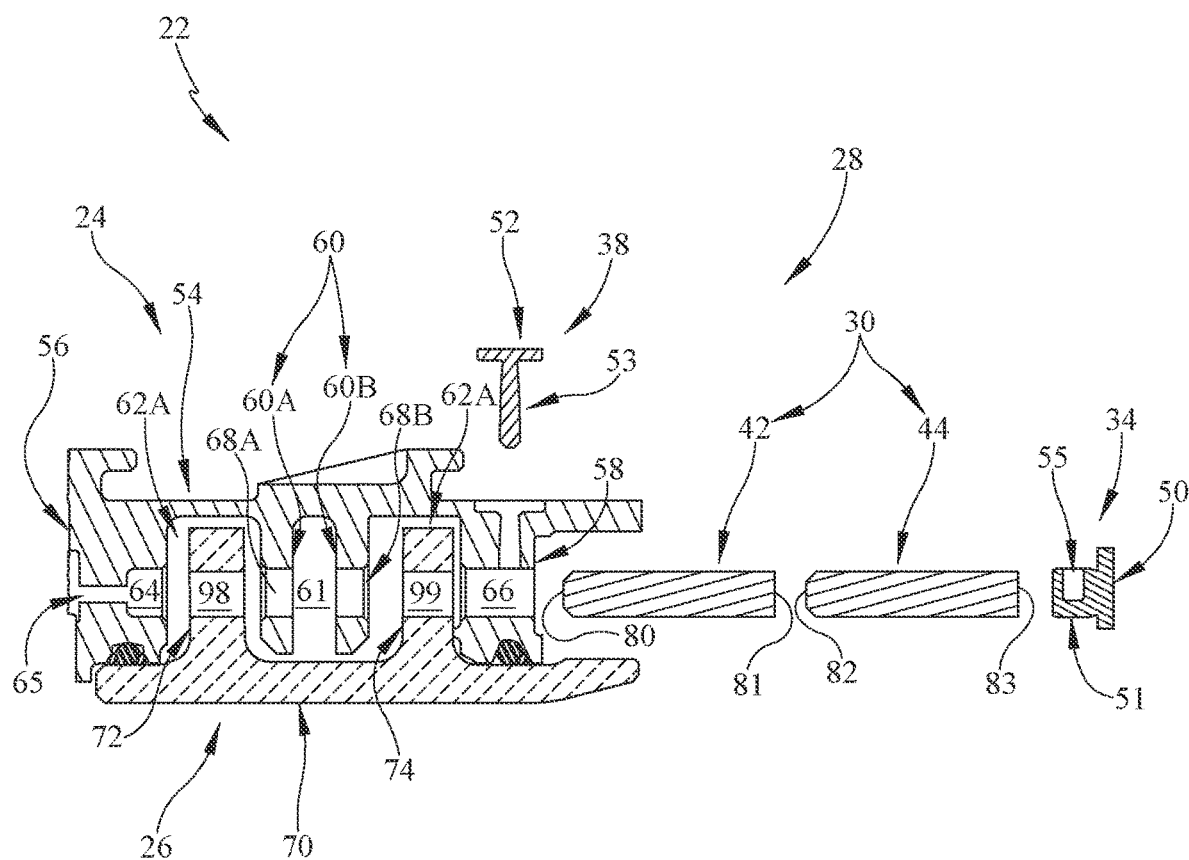
FIG. 6 is an exploded view of FIG. 5 showing the first retainer plug removed so that the forward and aft pins are moved axially aft out of from between the carrier and the seal segment.

Each of the first split-pin fastener 30 and the second split-pin fastener 32 is made up of a forward pin 42, 46 and an aft pin 44, 48 as shown in FIGS. 4-6. The forward and aft pins 42, 44, 46, 48 each extend axially through the seal segment 26 into the carrier 24. The aft pin 44, 48 is circumferentially aligned with and aft of the forward pin 42, 46.

In the illustrative embodiment, the forward pin 42, 46 is in direct confronting relation with the aft pin 44, 48, while remaining separate from the aft pin 44, 48. By installing two pins 42, 44, 46, 48 instead of one single axial pin, the pins 42, 44, 46, 48 allow for independent loading during use in the gas turbine engine 10. The independent loading of the pins 42, 44, 46, 48 accommodates manufacturing tolerances and increases the number of loading points for the seal segment 26. The increased number of loading points decreases localized stresses in the assembly 22.

Additionally, the split-pin fasteners 30, 32 allow each pin 42, 44, 46, 48 to find their own center. In this way, leakage between seals 27, 29 on the forward and aft sides of the seal segment 26 normally caused by misalignment of the holes in the carrier 24 and the seal segment 26 is reduced.

In the illustrative embodiment, the mount assembly 28 further includes retainer plugs 34, 36 and retainer pins 38, 40 as shown in FIGS. 4-6. The retainer plugs 34, 36 are configured to block removal of the corresponding split-pin fastener 30, 32. The retainer plugs 34, 36 extend into the carrier 24 and engage the aft pin 44, 48 to block removal of the split-pin fastener 30, 32. The retainer pin 38, 40 extend radially inward into the corresponding retainer plug 34, 36 to block axial movement of the retainer plug 34, 36.

Each of the retainer plugs 34, 36 is shaped to include a head 50 and a shaft 51 as shown in FIGS. 5 and 6 The head 50 engages the carrier 24 to locate the retainer plug 34, 36 relative to the split-pin fastener 30, 32. The shaft 51 extends axially from the head 50. The shaft 51 engages the split-pin fastener 30, 32 to block removal of the split-pin fastener 30, 32.

Each of the retainer pins 38, 40 is shaped to include a head 52 and a shaft 53 as shown in FIGS. 5-6. The head 52 engages the carrier 24 to locate the retainer pin 38, 40 relative to the retainer plug 34, 36. The shaft 53 extends axially from the head 52. The shaft 53 extends radially into a blind hole 55 the shaft 51 of the retainer plug 34, 36 to block axial movement of the retainer plug 34, 36.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
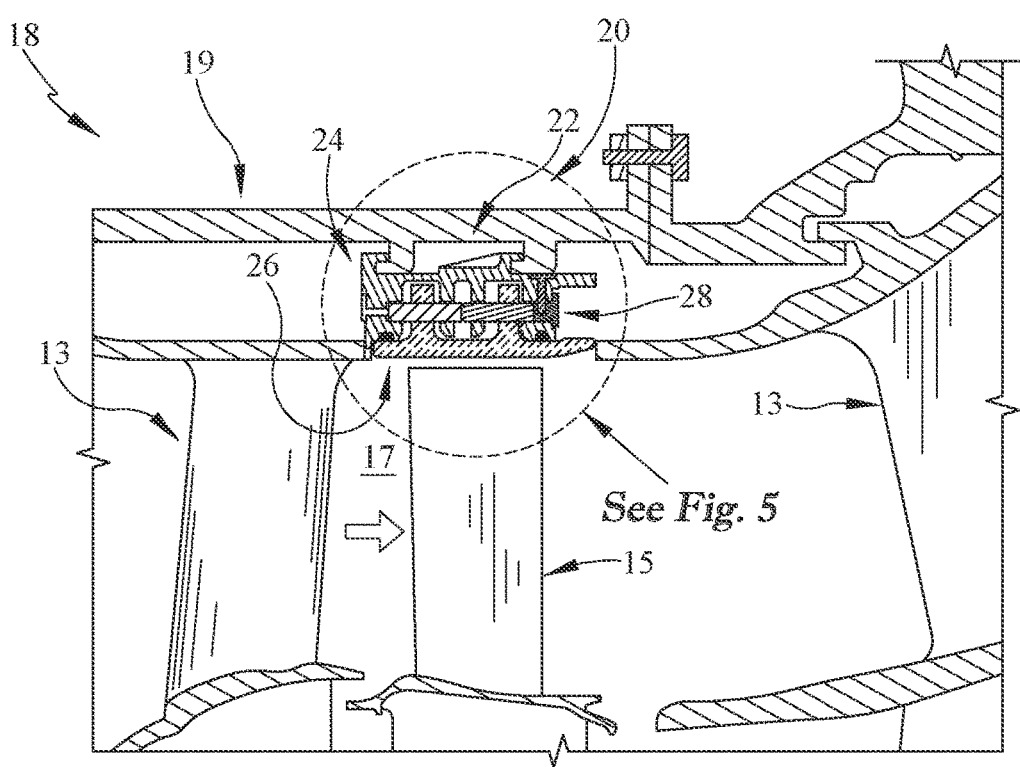
FIG. 2 is a section view of a portion of the gas turbine engine of FIG. 1 showing the turbine further includes a turbine shroud assembly positioned radially outward from blades of one of the rotating wheel assemblies, the turbine shroud assembly including a carrier, a seal segment, and a mount assembly having split-pin fasteners that couple the seal segment to the carrier.
Figure 3:
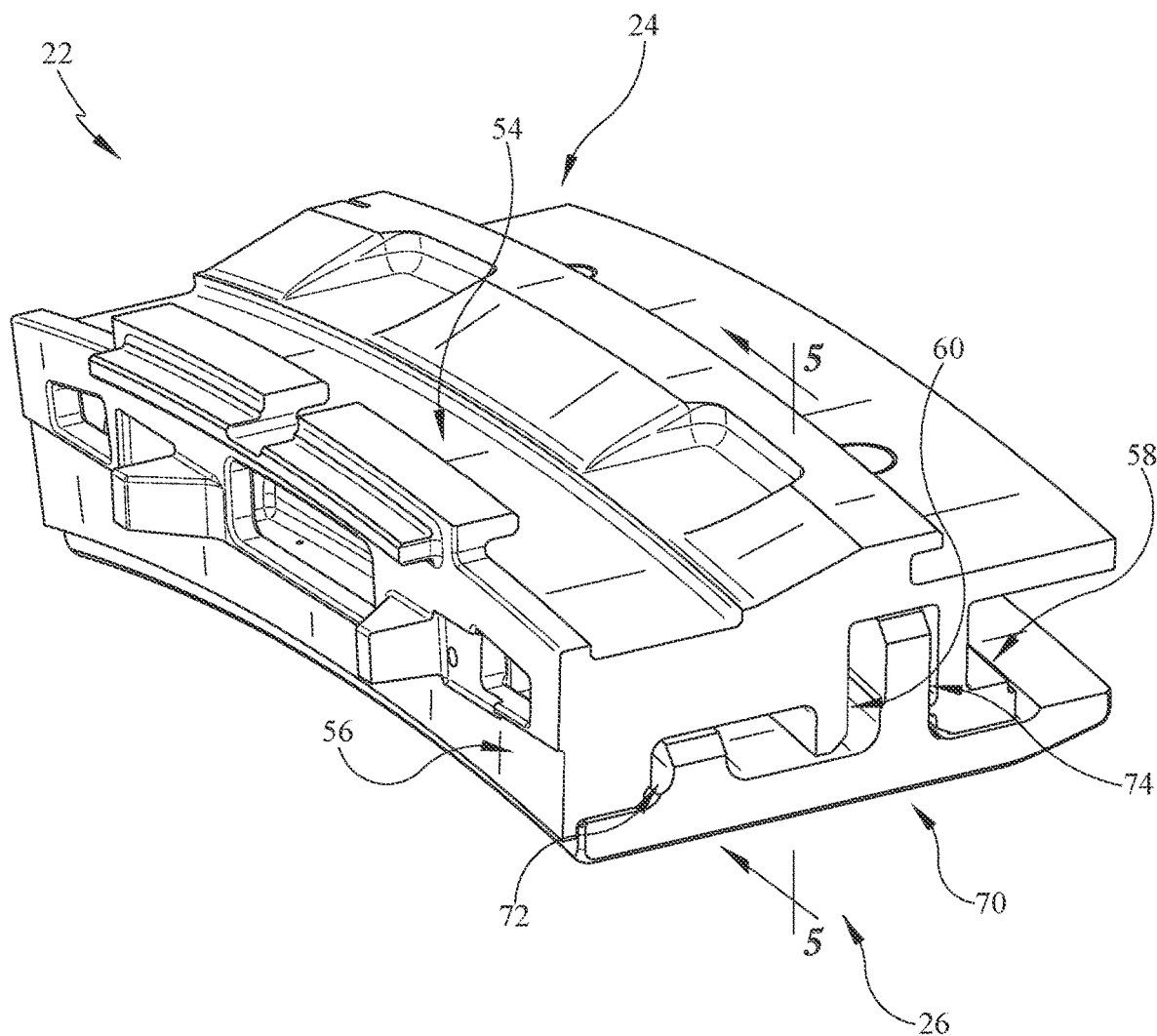
FIG. 3 is a perspective view of the turbine shroud assembly of FIG. 2 showing the carrier is segmented and extends only partway about an axis of the gas turbine engine.

The turbine 18 includes at least one turbine wheel assembly 13 and a turbine shroud assembly 20 positioned to surround the turbine wheel assembly 13 as shown in FIGS. 1 and 2. The turbine shroud assembly 20 is coupled to a case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 21. The blades 15 are in turn pushed by the combustion products to cause the turbine wheel assembly 13 to rotate; thereby, driving the rotating components of the compressor 14 and/or the fan 12.

The turbine shroud assembly 20 extends around the turbine wheel assembly 13 to block combustion products from passing over the blades 15 without pushing the blades 15 to rotate as suggested in FIG. 2. In the illustrative embodiment, the turbine shroud assembly 20 is made up of a number of shroud segments 22, one of which is shown in FIGS. 3-6, that extend only partway around the central axis 11 and cooperate to surround the turbine wheel assembly 13. The shroud segments 22 are sealed against one another, such as by strip seal members, to provide a continuous turbine shroud assembly 20.

In other embodiments, the turbine shroud assembly 20 is annular and non-segmented to extend fully around the central axis 11 and surround the turbine wheel assembly 13. In yet other embodiments, certain components of the turbine shroud assembly 20 are segmented while other components are annular and non-segmented.

Each shroud segment 22 includes the carrier 24, the seal segment 26, and the mount assembly 28 as shown in FIGS. 2-6. In the illustrative embodiment, the seal segment 26 comprises ceramic matrix composite materials, while the carrier 24 comprises metallic materials. In other embodiments, the carrier 24, the seal segment 26, and the mount assembly 28 may each comprise any suitable materials including ceramics, ceramic matrix composites, metals, alloys, super alloys, etc.

The carrier 24 included in each shroud segment 22 is coupled to the case 19 of the engine 10 as shown in FIG. 2. In the illustrative embodiment, the carrier 24 is segmented, while in other embodiments, the carrier 24 may be a full hoop and extend about the axis 11.

Each carrier segment 24 illustratively includes an outer wall 54, a forward support wall 56, an aft support wall 58, and a central support wall 60 as shown in FIGS. 5 and 6. The outer wall 54 extends circumferentially at least partway about the axis 11. The forward, aft, and central support walls 56, 58, 60 each extends radially inward from the outer wall 54. The aft support wall 58 is spaced axially from the forward support wall 56. The central support wall 60 is located axially between the forward support wall 56 and the aft support wall 58 to form cavities 62A, 62B.

The forward support wall 56 is shaped to include axially-extending blind support holes 64 as shown in FIGS. 5 and 6. The first axially-extending blind support hole 64 receives a portion of the first split-pin fastener 30. The second axially-extending blind support hole (not shown) is spaced apart circumferentially from the first axially-extending blind support hole 64 and receives a portion of the second split-pin fastener 32.

Similarly, the aft support wall 58 is shaped to include axially-extending installation apertures 66 as shown in FIGS. 5 and 6. The first axially-extending installation aperture 66 receives another portion of the first split-pin fastener 30. The second axially-extending installation aperture (not shown) is spaced apart circumferentially from the first axially-extending installation aperture 66 and receives another portion of the second split-pin fastener 32.

The central support wall 60 is shaped to include support holes 68A, 68B as shown in FIGS. 5 and 6. The first support holes 68A, 68B receive the first split-pin fastener 30. The second support holes (not shown) are spaced apart circumferentially from the first support holes 68A, 68B and receive the second split-pin fastener 32.

In the illustrative embodiment, the central support wall 60 is formed by a forward support plate 60A and an aft support plate 60B as shown in FIGS. 5 and 6. The forward and aft support plates 60A, 60B each extends radially inward from the outer wall 54. The aft support plate 60B is spaced apart axially from the forward support plate 60B to define a gap 61 axially therebetween.

The first central support wall 60A includes forward support holes 68A, while the second central support wall 60B includes aft support holes 68B as shown in FIGS. 5 and 6. The support holes 68A, 68B are aligned with the corresponding axially-extending blind support holes 64 and axially-extending installation apertures 66 to receive the split-pin fasteners 30, 32.

In some embodiments, any of the holes 64, 66, 68A, 68B may be oval shaped. In other embodiments, any of the holes 64, 66, 68A, 68B may be racetrack shaped. In the illustrative embodiment, the holes 64, 66, 68A, 68B are circular in shape.

The seal segment 26 is shaped to include a runner 70, a forward mount flange 72, and an aft mount flange 74 as shown in FIGS. 4-6. The runner 70 extends circumferentially partway around the axis 11 to define the gas path boundary 21 of the shroud assembly 22. The forward and aft mount flanges 72, 74 each extends radially outward from the runner 70. The aft mount flange 74 is spaced apart axially from the forward mount flange 72 to define an inverted 7 shape of the seal segment 26.

The forward mount flange 72 is arranged between the forward support wall 56 and the central support wall 60 of the carrier 24 in the forward cavity 62A. The aft mount flange 74 is arranged between the aft support wall 58 and the central support wall 60 of the carrier 24 in the aft cavity 62B.

The forward pin 42, 46 extends axially through the forward mount flange 72 of the seal segment 26 into the forward support wall 56 and the central support wall 60 of the carrier 24. One end 80 of the forward pin 42, 46 extends into the axially-extending blind support hole 64 of the forward support wall 56 while the other end 81 of the forward pin 42, 46 extends into the forward support hole 68A of the forward support plate 60A.

The aft pin 44, 48 extends axially through the aft mount flange 74 of the seal segment 26 into the aft support wall 58 and the central support wall 60 of the carrier 24. One end 82 of the aft pin 44, 48 extends into the aft support hole 68B of the aft support plate 60B, while the other end 83 of the aft pin 44, 48 extends in the axially-extending installation aperture 66 of the aft support wall 58.

The second end 81 of the forward pin 42, 46 is in direct confronting relation with the first end 82 of the aft pin 44, 48, while remaining separate from the aft pin 44, 48 so as to allow for independent loading during use in the gas turbine engine. In the illustrative embodiment, the second end 81 of the forward pin 42, 46 and the first end 82 of the aft pin 44, 48 meet in the gap 61 between the forward and aft support plates 60A, 60B.

In the illustrative embodiment, the surface that forms the second end 81 of the forward pin 42, 46 may be adhered to the first end 82 of the aft pin 44, 48 for installation purposes. The second end 81 of the forward pin 42, 46 may be adhered to the first end 82 of the aft pin 44, 48 with a glue. During use of the gas turbine engine 10, the glue may burn away, allowing the pins 42, 44, 46, 48 to act independently.

In the illustrative embodiment, the first ends 80, 82 of the pins 42, 44, 46, 48 have a chamfer 80C, 82C as shown in FIG. 5. The chamfer 80C, 82C may help during installation. In other embodiments, the ends 80, 81, 82, 83 may be flat with no chamfer.

In the illustrative embodiment, each of the retainer plugs 34, 36 extends into the axially-extending installation apertures 66 in the aft support wall 58. The first retainer plug 34 extends into the first axially-extending installation aperture 66 to block removal of the first split-pin fastener 30 through the first axially-extending installation aperture 58. The second retainer plug 36 extends into the second axially-extending installation aperture (not shown) to block removal of the second split-pin fastener 32 through the second axially-extending installation aperture.

In the illustrative embodiments, the split-pin fasteners 30, 32 are installed through the aft support wall 58 of the carrier 24. In other embodiments, the split-pin fasteners 30, 32 may be installed through the forward support wall 56.

A method of assembling the turbine shroud segment 22 may include steps. To begin, the seal segment 26 is located adjacent to the carrier 24. The seal segment 26 is located adjacent to the carrier 24 so that the forward and aft mount flanges 72, 74 extend into the corresponding cavities 62A, 62B in the carrier 24. Each of the forward and aft mount flanges 72, 74 are inserted into the corresponding cavities 62A, 62B such that pin holes 98, 99 in the mount flanges 72, 74 align with the blind support holes 64, the installation apertures 66, and the support holes 68A, 68B.

The split-pin fasteners 30, 32 may then be inserted into the carrier 524 and through the forward and aft mount flanges 72, 74 of the seal segment 26. The first split-pin fastener 30 is inserted through the first installation aperture 66 so that the first split-pin fastener 30 extends through the aft mount flange 74, the central support wall 60, and the forward mount flange 72 into the first blind support hole 64. The second split-pin fastener 32 is inserted through the second installation aperture so that the second split-pin fastener 32 extends through the aft mount flange 74, the central support wall 60, and the forward mount flange 72 into the second blind support hole.

In the illustrative embodiment, the forward and aft pins 42, 44, 46, 48 of each split-pin fastener 30, 32 are adhered together when they are inserted into the carrier 24 through the seal segment 26. In other embodiments, the forward pin 42, 46 may be inserted first and the aft pin 44, 48 may be inserted after the forward pin through the same installation aperture 66.

Once the split-pin fastener 30, 32 is inserted, the corresponding retainer plug 34, 36 is inserted into the installation aperture 66. The first retainer plug 34 is inserted into the first installation aperture 66 so that the head 50 of the retainer plug 34 engages the aft support wall 58. The engagement of the head 50 with the aft support wall 58 should located the shaft 51 of the retainer plug 34 so that the shaft 51 engages or abuts the second end 83 of the aft pin 44.

Similarly, the second retainer plug 36 is inserted into the second installation aperture so that the head 50 of the retainer plug 36 engages the aft support wall 58. The engagement of the head 50 with the aft support wall 58 should located the shaft 51 of the retainer plug 36 so that the shaft 51 engages or abuts the second end 83 of the aft pin 48.

The retainer pin 38, 40 is then inserted radially into the carrier 24 to block removal of the corresponding retainer plug 34, 36. The first retainer pin 38 is inserted into the outer wall 54 and the aft support wall 58 of the carrier 24 so that the head 52 of the retainer pin 38 engages the outer wall 54 of the carrier 24. Engagement of the head 52 of the retainer pin 38 with the outer wall 54 ensures the shaft 53 of the retainer 38 is properly located relative to the retainer plug 34. The shaft 53 of the retainer pin 38 extends into the blind hole 55 formed in the retainer plug 34 to block axial movement of the retainer plug 34.

Similarly, the second retainer pin 40 is inserted into the outer wall 54 and the aft support wall 58 of the carrier 24 so that the head 52 of the retainer pin 40 engages the outer wall 54 of the carrier 24. Engagement of the head 52 of the retainer pin 40 with the outer wall 54 ensures the shaft 53 of the retainer 38 is properly located relative to the retainer plug 36. The shaft 53 of the retainer pin 40 extends into the blind hole (not shown) formed in the retainer plug 36 to block axial movement of the retainer plug 36.

To disassemble the turbine shroud segment 22, the retainer pins 38, 40 are removed first. This allows the each of the retainer plugs 34, 36 to be removed from the installation apertures 66 as shown in FIG. 6.

Figure 7:
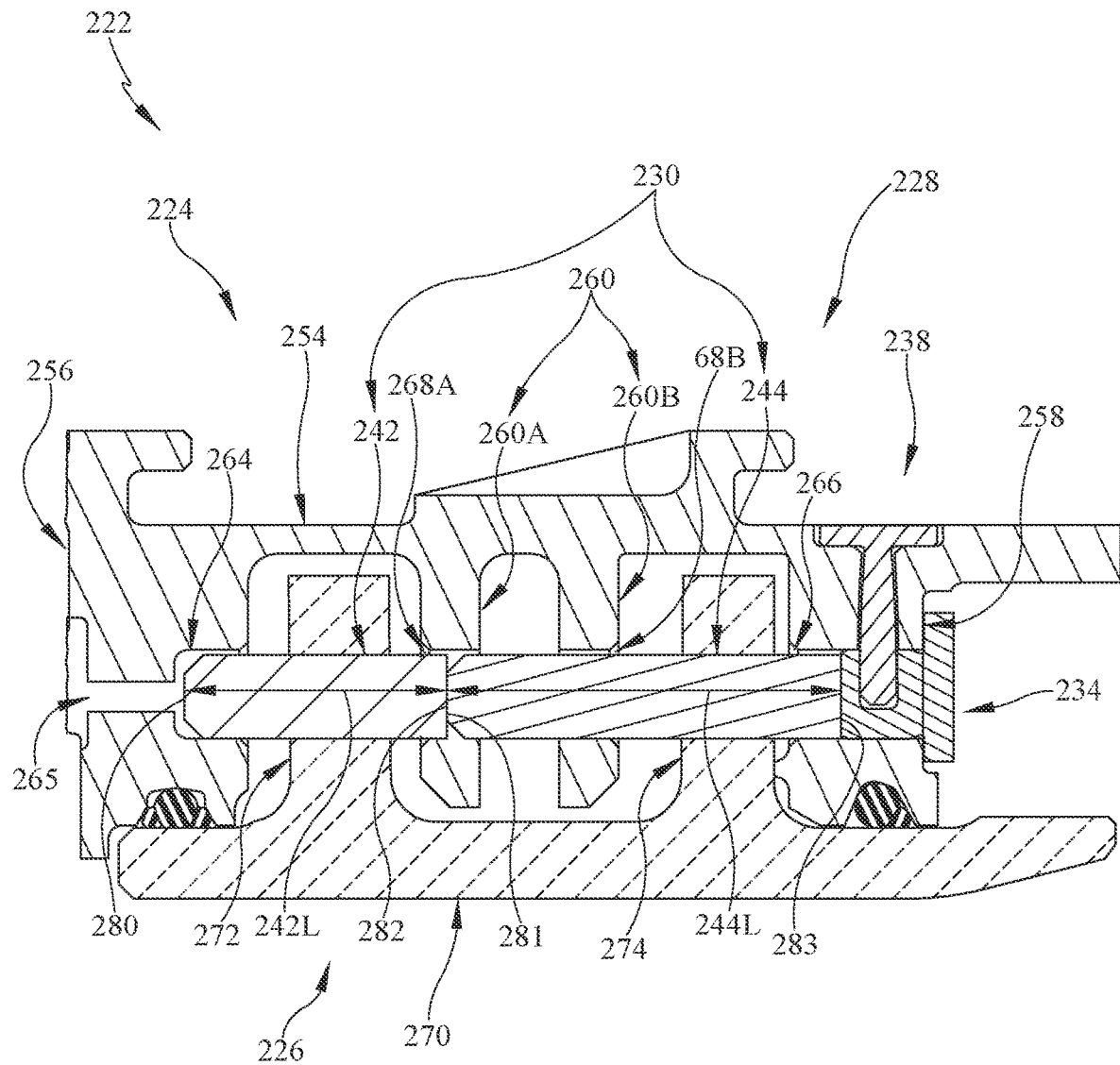
FIG. 7 is a detail cross-sectional view of another turbine shroud assembly like the turbine shroud assembly in FIGS. 1-7 showing that a length of the forward pin is shorter than the aft pin.

The aft pin 44, 48 may then be removed out through the installation aperture 66 like as shown in FIG. 6. In the illustrative embodiment, the forward support wall 56 includes push out holes 65 as shown in FIGS. 5-7. Each push out hole 65 extends axially into the forward support wall 56 and opens into the corresponding blind hole 64. A removal tool (not shown) may be inserted through the push out hole 65 to push the split-pin fastener 30, 32 out through the installation aperture 66.

The removal tool is inserted through the push out hole 65 and engages the first end 80 of the forward pin 42, 46. The removal tool then pushes the forward pin 42, 46 axially aft, which causes the aft pin 44, 48 to move axially aft out through the installation aperture 66. The removal tool may be used to push the forward pin 42, 46 the rest of the way out through the installation aperture 66.

In this way, the seal segment 26 is free to be moved away from the carrier 24. The seal segment 25 may be moved in a radial direction so that the forward and aft mount flanges 72, 74 are moved out of the cavities 62A, 62B.

Figure 8:
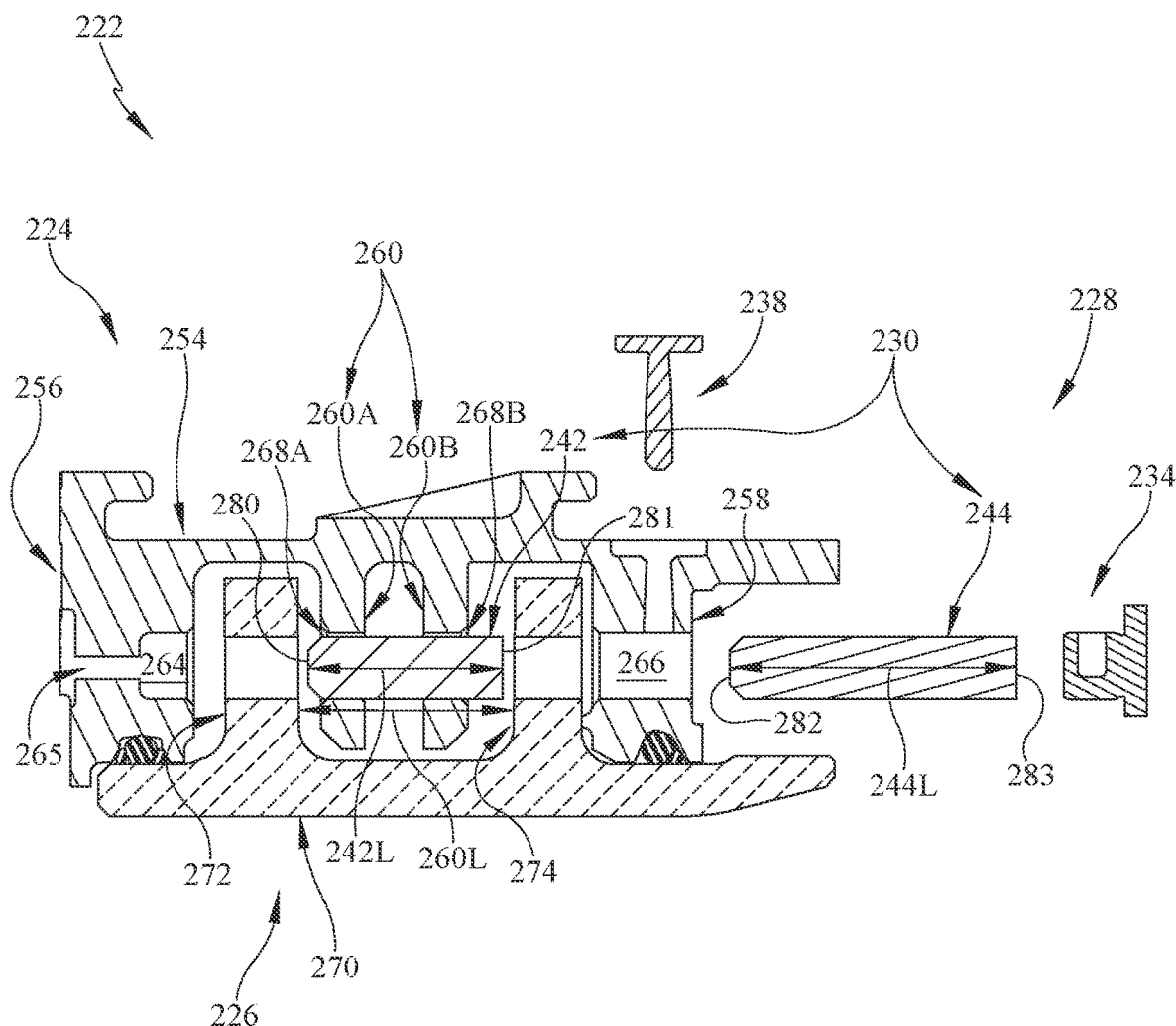
FIG. 8 is an exploded view of FIG. 7 showing the first retainer plug removed so that the aft pin is moved axially aft out of the carrier and the forward pin is moved between the forward and aft mount flanges of the seal segment.
Figure 9:
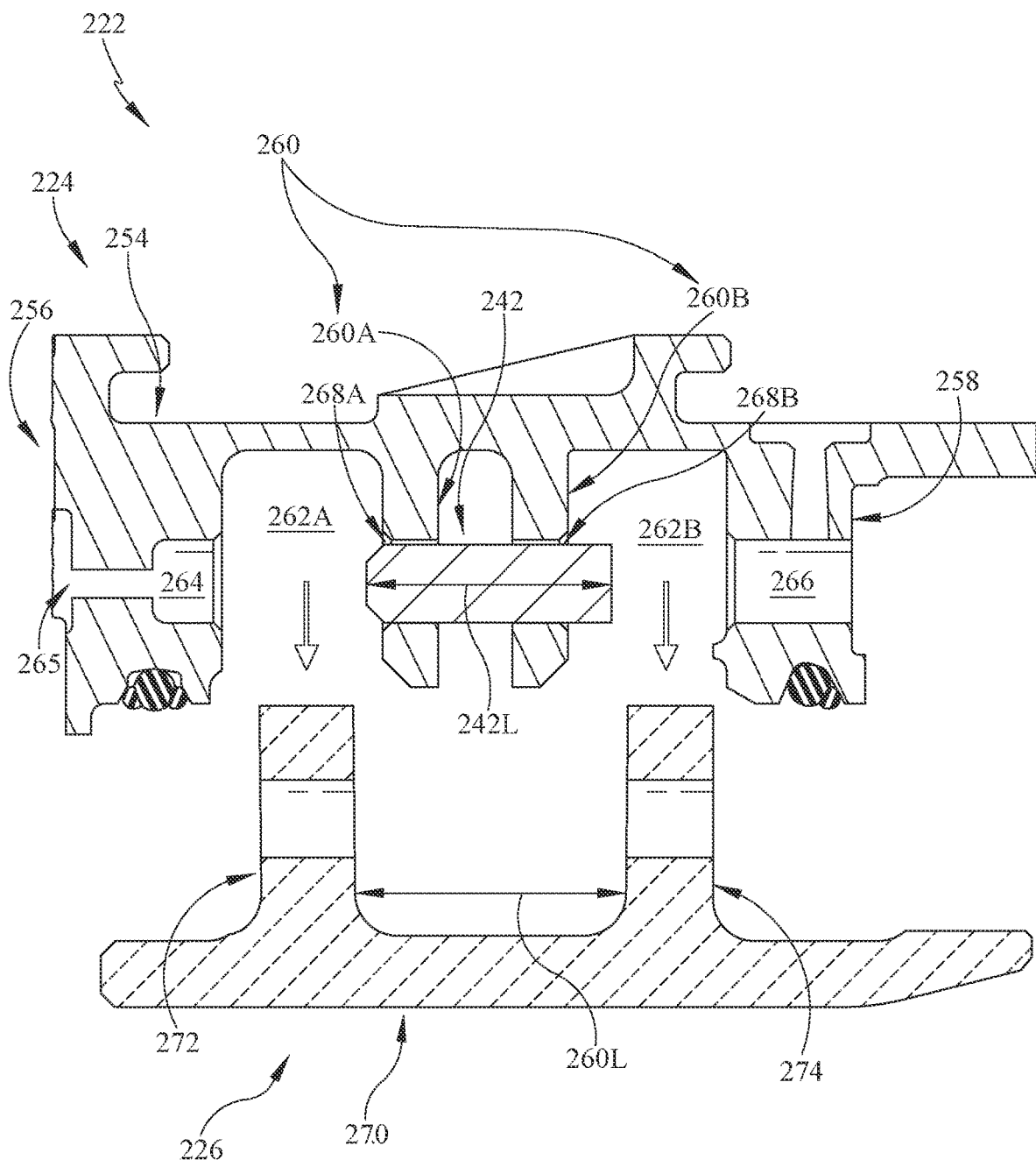
FIG. 9 is an exploded view of FIG. 8 showing the forward pin has a shorter axial length than an axial space between forward and aft mount flanges of the seal segment so that the seal segment may be spaced apart from the carrier to disassemble the turbine shroud assembly.

Another embodiment of a turbine shroud segment 222 in accordance with the present disclosure is shown in FIGS. 7-9. The turbine shroud segment 222 is substantially similar to the turbine shroud segment 22 shown in FIGS. 1-6 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 222.

The turbine shroud segment 222 includes a carrier 224, a seal segment 226, and a mount assembly 228 configured to couple the seal segment 226 to the carrier 224 as shown in FIGS. 7-9. The carrier 224 includes an outer wall 254 and support walls 256, 258, 260 that extend radially inward from the outer wall 254. The seal segment 226 includes a runner 270 and forward and aft mount flanges 272, 274 that extend radially outward away from the runner 270. The mount assembly 228 includes a first split-pin fastener 230 and a second split-pin fastener (not shown) that cooperate to couple the mount flanges 272, 274 of the seal segment 226 with the support walls 256, 258, 260 of the carrier 224 to support the seal segment 226 radially relative to the axis 11 of the gas turbine engine 10.

Each of the split-pin fasteners 230 is made up of a forward pin 242 and an aft pin 244 as shown in FIGS. 7-9. The forward and aft pins 242, 244 each extend axially through the seal segment 226 into the carrier 224. The aft pin 244 is circumferentially aligned with and aft of the forward pin 242. The forward pin 242 is in direct confronting relation with the aft pin 244 while remaining separate from the aft pin 244.

In the illustrative embodiment, the forward pin 242 has a first axial length 242L as shown in FIGS. 7-9. The first axial length 242L of the forward pin 242 is shorter than an axial space 260L defined between the forward mount flange 272 and the aft mount flange 274 of the seal segment 226.

The axial length 242L of the forward pin 242 helps facilitate decoupling of the seal segment 226 from the carrier 224 without complete removal of the split-pin fastener 230 from the shroud assembly 222. When disassembling the turbine shroud assembly 222, the forward pin 242 may move axially aft so that the forward pin 242 is between the forward and aft mount flanges 272, 274 of the seal segment 226 as shown in FIGS. 8 and 9. The forward pin 242 may be located in the central support wall 260 with the ends 280, 281 of the pin 242 spaced apart from the forward and aft mount flanges 272, 274.

In this way, the seal segment 226 is free to be moved away from the carrier 224 as shown in FIG. 9. The seal segment 226 may be moved in the radial direction so that the forward and aft mount flanges 272, 274 are moved out of cavities 262A, 262B formed in the carrier 224.

In the illustrative embodiment, the second pin 244 has a second axial length 244L that is greater than the first axial length 242L of the forward pin 242 as shown in FIGS. 7 and 8. The second axial length 244L of the aft pin 244 fills the space between the end 281 of the forward pin 242 and the aft support wall 258 when assembled.

In the illustrative embodiment, the forward pin 242 extends axially through the forward mount flange 272 of the seal segment 226 into the forward support wall 256 and the central support wall 260 of the carrier 224. One end 280 of the forward pin 242 extends into an axially-extending blind support hole 264 of the forward support wall 256, while the other end 281 of the forward pin 242 extends into a forward support hole 268A formed in the central support wall 260 and abuts the aft pin 244.

The aft pin 244 extends axially through the aft mount flange 274 of the seal segment 226 into the aft support wall 258 and the central support wall 260 of the carrier 224. One end 282 of the aft pin 244 extends through an aft support hole 268B of the central support wall 260 into the forward support hole 268A. The other end 283 of the aft pin 244 extends in an axially-extending installation aperture 266 of the aft support wall 258.

The first end 282 of the aft pin 244 is in direct confronting relation with the second end 281 of the forward pin 242, while remaining separate from the forward pin 242 so as to allow for independent loading during use in the gas turbine engine. In the illustrative embodiment, the second end 281 of the forward pin 242 and the first end 282 of the aft pin 244 meet in the forward support hole 268A in the forward support plates 260A of the central support wall 260 in the illustrative embodiment.

A method of assembling the turbine shroud segment 222 may be similar to the method of assembling the embodiment of FIGS. 1-7. However, to disassemble the turbine shroud segment 222, the forward pin 242 need not be removed entirely.

To disassembly the turbine shroud assembly 222, the retainer pin 238 is removed first. This allows the each of the retainer plug 234 to be removed from the installation aperture 266 as shown in FIG. 8.

The aft pin 244 may then be removed out through the installation aperture 266 like as shown in FIG. 8. In the illustrative embodiment, the forward support wall 256 includes push out holes 265 as shown in FIGS. 7-9. Each push out hole 265 extends axially into the forward support wall 256 and opens into the corresponding blind hole 264. A removal tool (not shown) may be inserted through the push out hole 265 to push the split-pin fastener 230 out through the installation aperture 266.

The removal tool is inserted through the push out hole 265 and engages the first end 280 of the forward pin 242. The removal tool then pushes the forward pin 242 axially aft, which causes the aft pin 244 to move axially aft out through the installation aperture 266.

The removal tool may be used to push the forward pin 242 between the forward and aft mount flanges 272, 274. In this way, the seal segment 226 is free to be moved away from the carrier 224.

The seal segment 226 may be moved in the radial direction so that the forward and aft mount flanges 272, 274 are moved out of the cavities 262A, 262B as shown in FIG. 9. The forward pin 242 remains extending through the support holes 268A, 268B of the central support wall 260.

Figure 10:
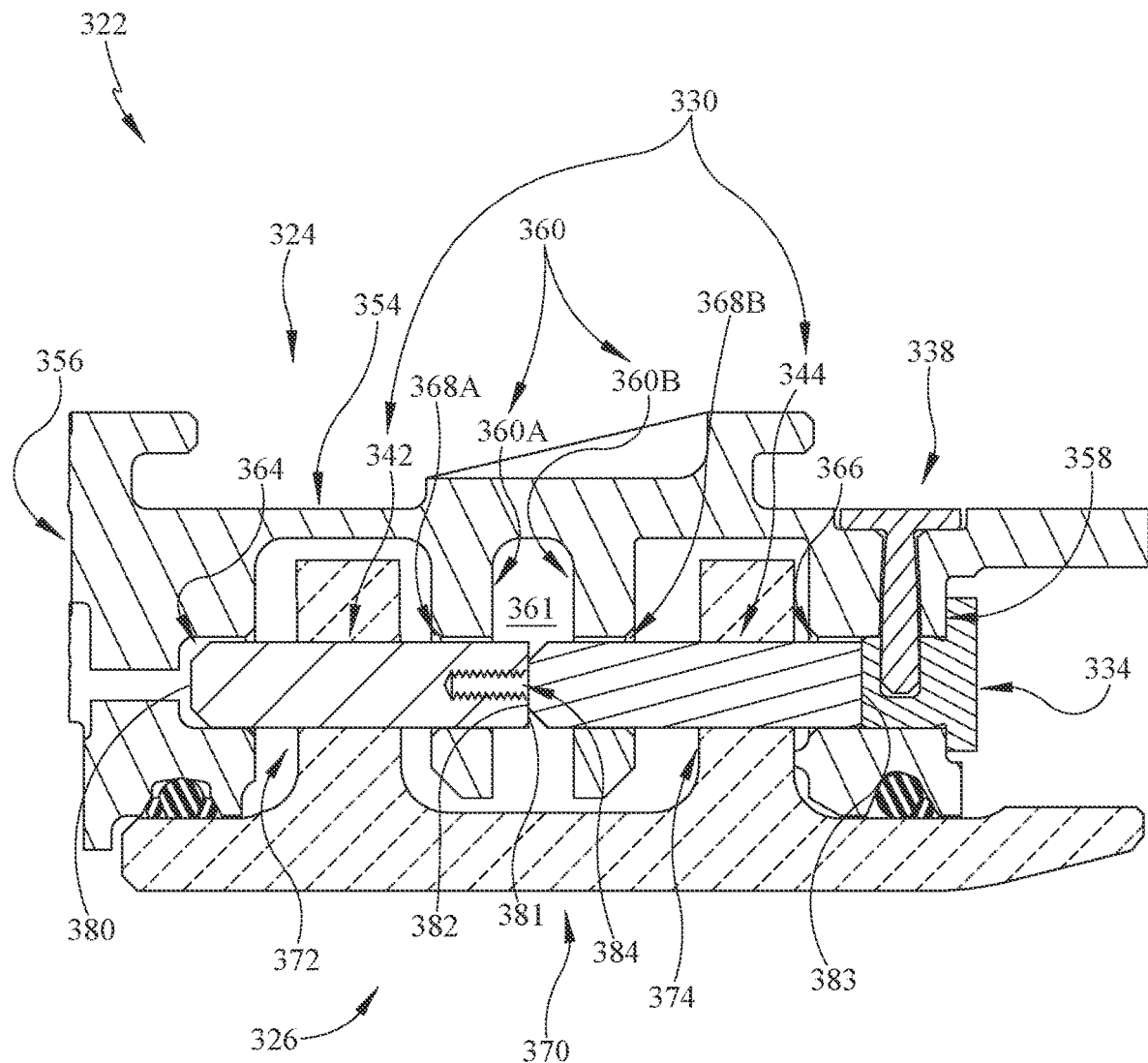
FIG. 10 is a detail cross-sectional view of another turbine shroud assembly like the turbine shroud assembly in FIGS. 1-7 showing that the forward pin of the split-pin fastener includes a removal feature formed by threads to be engaged by a mating threaded component to aid in the disassembly of the turbine shroud segment.

Another embodiment of a turbine shroud segment 322 in accordance with the present disclosure is shown in FIG. 10. The turbine shroud segment 322 is substantially similar to the turbine shroud segment 22 shown in FIGS. 1-7 and described herein. Accordingly, similar reference numbers in the 300 series indicate features that are common between the turbine shroud segment 22 and the turbine shroud segment 322. The description of the turbine shroud segment 22 is incorporated by reference to apply to the turbine shroud segment 322, except in instances when it conflicts with the specific description and the drawings of the turbine shroud segment 322.

The turbine shroud segment 322 includes a carrier 324, a seal segment 326, and a mount assembly 328 configured to couple the seal segment 326 to the carrier 324 as shown in FIG. 10. The carrier 324 includes an outer wall 354 and support walls 356, 358, 360 that extend radially inward from the outer wall 354. The seal segment 326 includes a runner 370 and forward and aft mount flanges 372, 374 that extend radially outward away from the runner 370. The mount assembly 328 includes a first split-pin fastener 330 and a second split-pin fastener (not shown) that cooperate to couple the mount flanges 372, 374 of the seal segment 326 with the support walls 356, 358, 360 of the carrier 324 to support the seal segment 326 radially relative to the axis 11 of the gas turbine engine 10.

Each of the split-pin fasteners 330 is made up of a forward pin 342 and an aft pin 344 as shown in FIG. 10. The forward and aft pins 342, 344 each extend axially through the seal segment 326 into the carrier 324. The aft pin 344 is circumferentially aligned with and aft of the forward pin 342. The forward pin 342 is in direct confronting relation with the aft pin 344 while remaining separate from the aft pin 344.

The forward pin 342 extends axially through the forward mount flange 372 of the seal segment 326 into the forward support wall 356 and the central support wall 360 of the carrier 324. One end 380 of the forward pin 342 extends into an axially-extending blind support hole 364 of the forward support wall 356, while the other end 381 of the forward pin 342 extends into a forward support hole 368A formed in the central support wall 360 and abuts the aft pin 344.

The second end 381 is shaped to include a removal feature 384 as shown in FIG. 10. The removal feature 384 aids in the removal of the forward pin 342 out of the support holes 364, 368A. In the illustrative embodiment, the removal feature 384 includes threads 384 sized to be engaged by a mating threaded component (not shown).

With the aft pin 344 removed, the mating threaded component may be inserted into the carrier 324 through the aft mount flange 374 and into the threaded blind hole 384 in the forward pin 342. The mating threaded component engages the threads 384 to couple with the forward pin 342 so that the mating threaded component may pull the forward pin 342 axially aft.

The aft pin 344 extends axially through the aft mount flange 374 of the seal segment 326 into the aft support wall 358 and the central support wall 360 of the carrier 324. One end 382 of the aft pin 344 extends into an aft support hole 368B of the central support wall 360, while the other end 383 of the aft pin 344 extends in an axially-extending installation aperture 366 of the aft support wall 358.

The first end 382 of the aft pin 344 is in direct confronting relation with the second end 381 of the forward pin 342, while remaining separate from the forward pin 342 so as to allow for independent loading during use in the gas turbine engine. In the illustrative embodiment, the second end 381 of the forward pin 342 and the first end 382 of the aft pin 344 meet in a gap 361 between forward and aft support plates 360A, 360B of the central support wall 360.

A method of assembling the turbine shroud segment 322 may be similar to the method of assembling the embodiment of FIGS. 1-7. However, to disassemble the turbine shroud segment 322, the mating threaded component may be used to help remove the forward pin 342.

First, the retainer pins 338 are removed, which allows the each of the retainer plugs 334 to be removed from the installation apertures 366. The aft pin 344 may then be removed out through the installation aperture 366 to give access to the removal feature 384 in the forward pin 342.

The mating threaded component is inserted through the installation aperture 366 in the aft support wall 358, the aft mount flange 374, and the support hole 368B in the central support wall 360 to engage the removal feature 384 of the forward pin 342. The mating threaded component is threaded with the threads 384 of the forward pin 342 to couple them together. The mating threaded component may then be pulled axially aft to remove the forward pin 342 out through the installation aperture 366.

Figure 11:
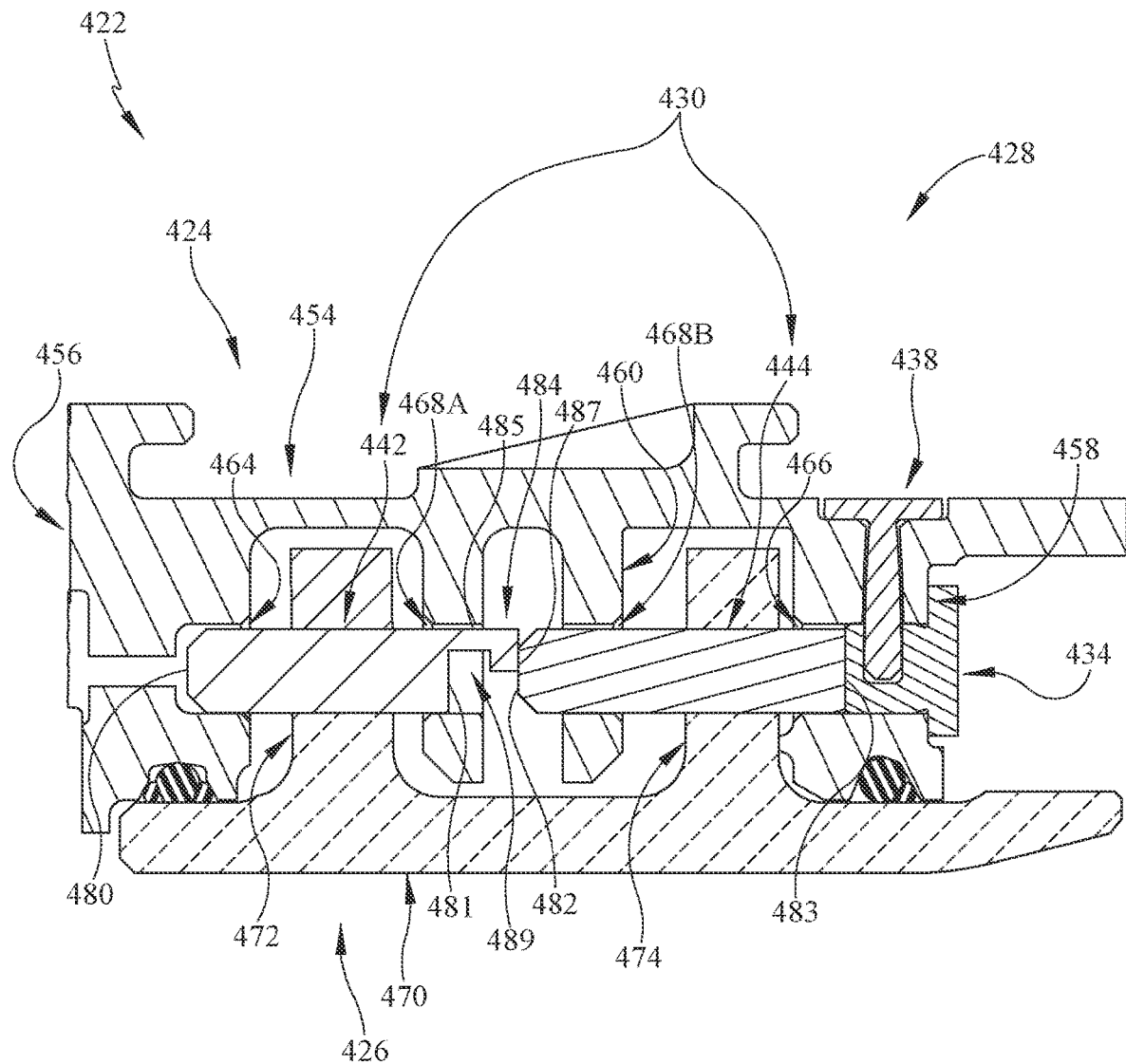
FIG. 11 is a detail cross-sectional view of another turbine shroud assembly like the turbine shroud assembly in FIGS. 1-7 showing that the removal feature includes a hook.

Another embodiment of a turbine shroud segment 422 in accordance with the present disclosure is shown in FIG. 11. The turbine shroud segment 422 is substantially similar to the turbine shroud segment 22 shown in FIGS. 1-7 and described herein. Accordingly, similar reference numbers in the 400 series indicate features that are common between the turbine shroud segment 22 and the turbine shroud segment 422. The description of the turbine shroud segment 22 is incorporated by reference to apply to the turbine shroud segment 422, except in instances when it conflicts with the specific description and the drawings of the turbine shroud segment 422.

The turbine shroud segment 422 includes a carrier 424, a seal segment 426, and a mount assembly 428 configured to couple the seal segment 426 to the carrier 424 as shown in FIG. 11. The carrier 424 includes an outer wall 454 and support walls 456, 458, 460 that extend radially inward from the outer wall 454. The seal segment 426 includes a runner 470 and forward and aft mount flanges 472, 474 that extend radially outward away from the runner 470. The mount assembly 428 includes a first split-pin fastener 430 and a second split-pin fastener (not shown) that cooperate to couple the mount flanges 472, 474 of the seal segment 426 with the support walls 456, 458, 460 of the carrier 424 to support the seal segment 426 radially relative to the axis 11 of the gas turbine engine 10.

Each of the split-pin fasteners 430 is made up of a forward pin 442 and an aft pin 444 as shown in FIG. 11. The forward and aft pins 442, 444 each extend axially through the seal segment 426 into the carrier 424. The aft pin 444 is circumferentially aligned with and aft of the forward pin 442. The forward pin 442 is in direct confronting relation with the aft pin 444 while remaining separate from the aft pin 444.

Like the embodiment of FIG. 10, the forward pin 442 is shaped to include a removal feature 484 as shown in FIG. 11. The removal feature 484 aids in the removal of the forward pin 442 out of the support holes 464, 468A. In the illustrative embodiment, the removal feature 484 is a hook 484. A removal tool (not shown) may then be used to grab the forward pin 442 by the hook 484 be able to pull the forward pin 442 axially aft.

The hook 484 includes an axially-extending portion 485 and a radially-extending portion 487 as shown in FIG. 11. The axially-extending portion 485 extends axially from the end 481 of the forward pin 442. The radially-extending portion 487 extends radially inward from the axially-extending portion 485 to define a channel 489 and forms the hook shape.

The other end 480 of the forward pin 442 is flat and extends into an axially-extending blind support hole 464 of the forward support wall 456. The other end 481 of the forward pin 442 with the removal feature 484 extends into a forward support hole 468A formed in the central support wall 460 and abuts the aft pin 444.

The aft pin 444 confronts the radially-extending portion 487 of the hook 484 as shown in FIG. 11. The end 482 of the aft pin 444 extends into an aft support hole 468B of the central support wall 460, while the other end 483 of the aft pin 444 extends in an axially-extending installation aperture 466 of the aft support wall 458.

A method of assembling the turbine shroud segment 422 may be similar to the method of assembling the embodiment of FIGS. 1-7. However, to disassemble the turbine shroud segment 422, the removal tool may be used to help remove the forward pin 442.

First, the retainer pins 438 are removed, which allows the each of the retainer plugs 434 to be removed from the installation apertures 466. The aft pin 444 may then be removed out through the installation aperture 466 to give access to the removal feature 484 in the forward pin 442.

The removal tool is inserted through the installation aperture 466 in the aft support wall 458, the aft mount flange 474, and the support hole 468B in the central support wall 460 to engage the hook 484 of the forward pin 442 in the channel 489. The removal tool may then be pulled axially aft to remove the forward pin 442 out through the installation aperture 466.

Figure 12:
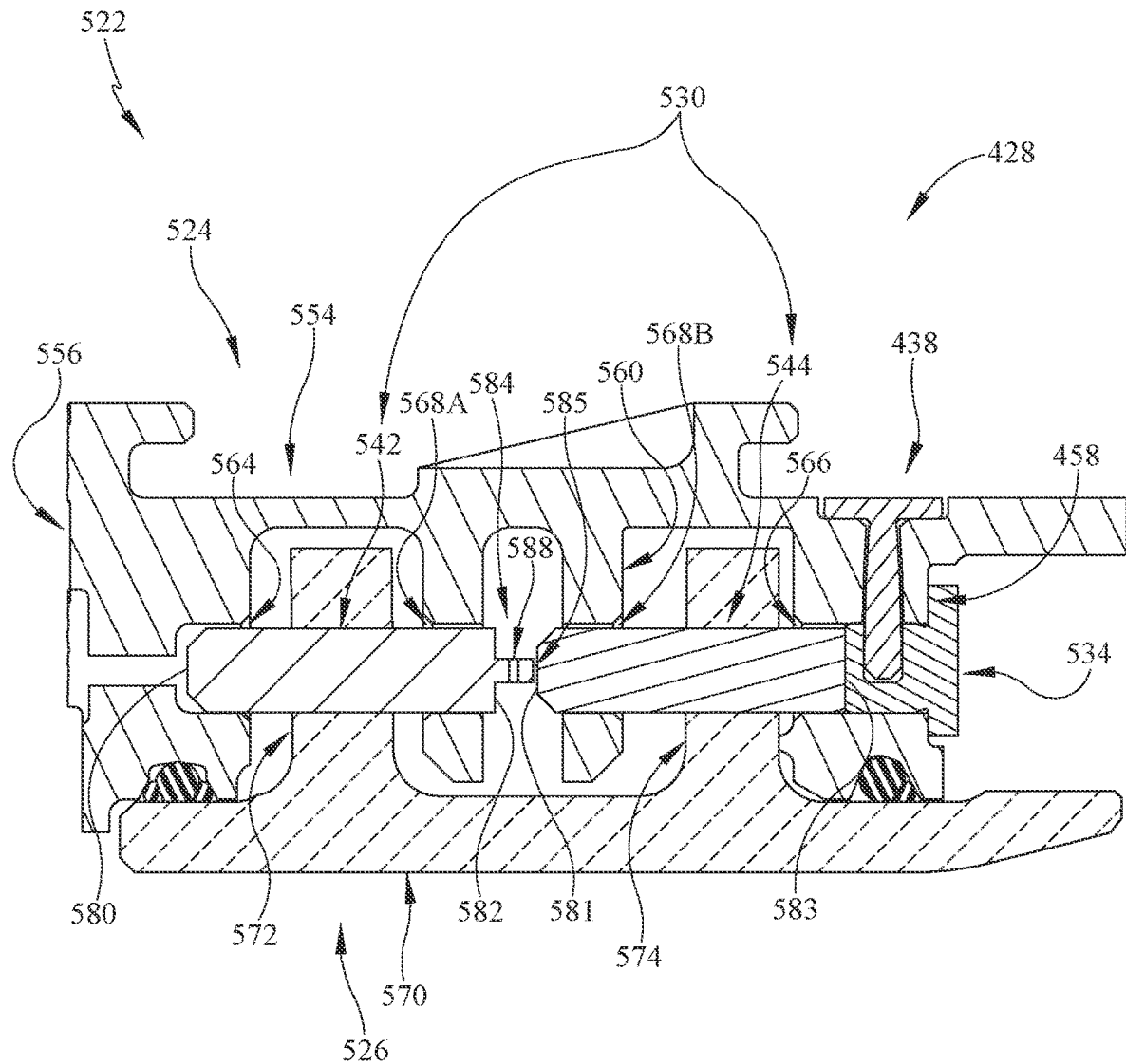
FIG. 12 is a detail cross-sectional view of another turbine shroud assembly like the turbine shroud assembly in FIGS. 1-7 showing that the removal feature includes a hook flange.
Figure 13:
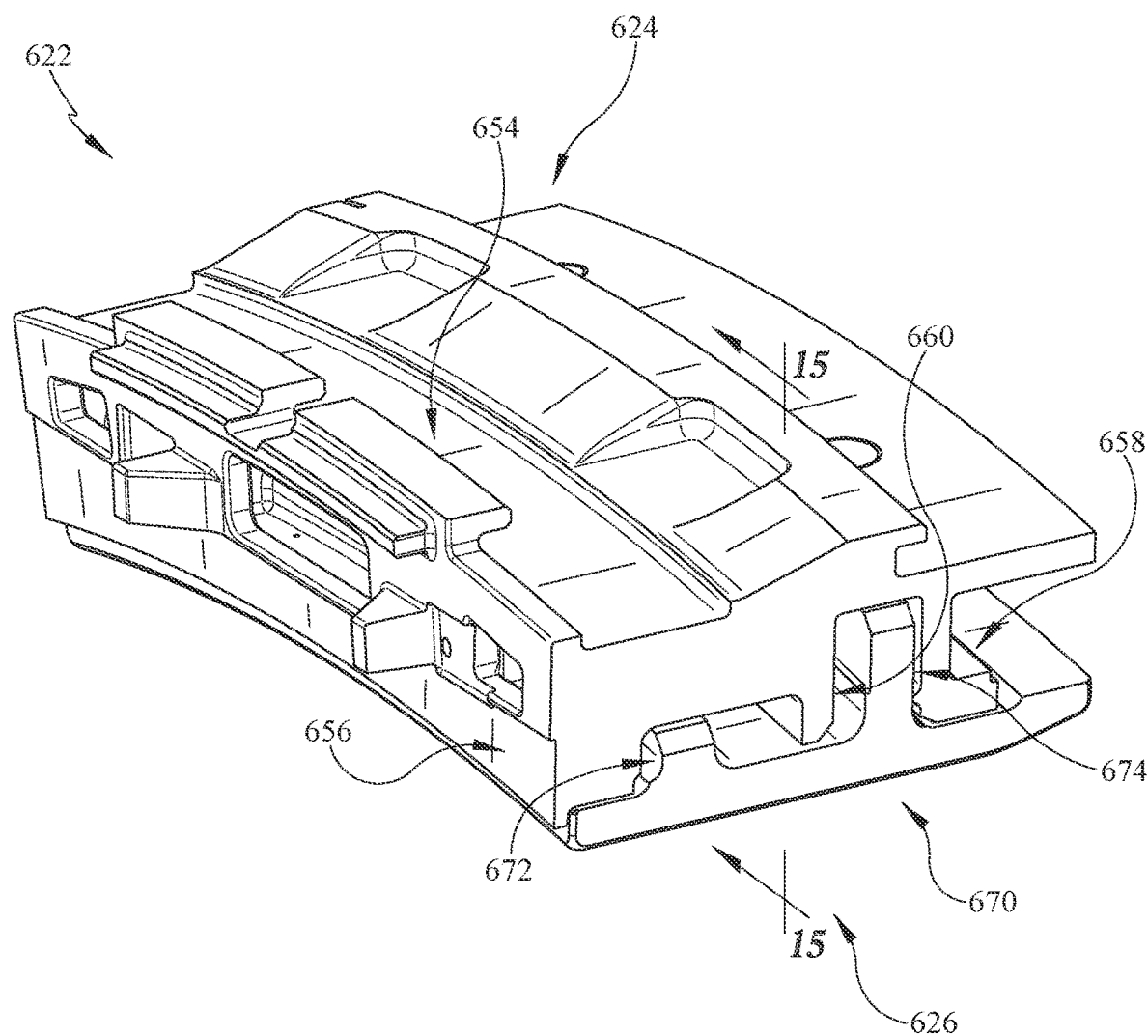
FIG. 13 is a perspective view of another turbine shroud assembly adapted for use in the gas turbine engine of FIG. 1.

Another embodiment of a turbine shroud segment 522 in accordance with the present disclosure is shown in FIG. 12. The turbine shroud segment 522 is substantially similar to the turbine shroud segment 22 shown in FIGS. 1-7 and described herein. Accordingly, similar reference numbers in the 500 series indicate features that are common between the turbine shroud segment 22 and the turbine shroud segment 522. The description of the turbine shroud segment 22 is incorporated by reference to apply to the turbine shroud segment 522, except in instances when it conflicts with the specific description and the drawings of the turbine shroud segment 522.

The turbine shroud segment 522 includes a carrier 524, a seal segment 526, and a mount assembly 528 configured to couple the seal segment 526 to the carrier 524 as shown in FIG. 12. The carrier 524 includes an outer wall 554 and support walls 556, 558, 560 that extend radially inward from the outer wall 554. The seal segment 526 includes a runner 570 and forward and aft mount flanges 572, 574 that extend radially outward away from the runner 570. The mount assembly 528 includes a first split-pin fastener 530 and a second split-pin fastener (not shown) that cooperate to couple the mount flanges 572, 574 of the seal segment 526 with the support walls 556, 558, 560 of the carrier 524 to support the seal segment 526 radially relative to the axis 11 of the gas turbine engine 10.

Each of the split-pin fasteners 530 is made up of a forward pin 542 and an aft pin 544 as shown in FIG. 12. The forward and aft pins 542, 544 each extend axially through the seal segment 526 into the carrier 524. The aft pin 544 is circumferentially aligned with and aft of the forward pin 542. The forward pin 542 is in direct confronting relation with the aft pin 544 while remaining separate from the aft pin 544.

Like the embodiment of FIGS. 10 and 11, the forward pin 542 is shaped to include a removal feature 584 as shown in FIG. 12. The removal feature 584 aids in the removal of the forward pin 542 out of the support holes 564, 568A. In the illustrative embodiment, the removal feature 584 is a flange 584. A removal tool (not shown) may then be used to grab the forward pin 542 by the hook flange 584 be able to pull the forward pin 542 axially aft.

The hook flange 584 includes an axially-extending portion 585 and a hole 588 as shown in FIG. 12. The axially-extending portion 585 extends axially from the end 581 of the forward pin 542. The hole 588 extends through the portion 585.

The removal tool, such as a pair of tweezers, may be used to grab ahold of the axially-extending portion 585 to be able to pull the forward pin 542 axially aft and out from between the seal segment 526 and the carrier 524. In some embodiments, a hook removal tool may be used to extend through hole 588 in the portion 585 and pull out the forward pin 542 by the hole 588.

The other end 580 of the forward pin 542 is flat and extends into an axially-extending blind support hole 564 of the forward support wall 556. The other end 581 of the forward pin 542 with the removal feature 584 extends into a forward support hole 568A formed in the central support wall 560 and abuts the aft pin 544.

The aft pin 544 confronts the axially-extending portion 585 of the hook 584 as shown in FIG. 12. The end 582 of the aft pin 544 extends into an aft support hole 568B of the central support wall 560, while the other end 583 of the aft pin 544 extends in an axially-extending installation aperture 566 of the aft support wall 558.

A method of assembling the turbine shroud segment 522 may be similar to the method of assembling the embodiment of FIGS. 1-7. However, to disassemble the turbine shroud segment 522, the removal tool may be used to help remove the forward pin 542.

First, the retainer pins 538 are removed, which allows the each of the retainer plugs 534 to be removed from the installation apertures 566. The aft pin 544 may then be removed out through the installation aperture 566 to give access to the removal feature 584 in the forward pin 542.

The removal tool is inserted through the installation aperture 566 in the aft support wall 558, the aft mount flange 574, and the support hole 568B in the central support wall 560 to engage the portion 585 of the forward pin 542. The removal tool may then be pulled axially aft to remove the forward pin 542 out through the installation aperture 566.

Another embodiment of a turbine shroud segment 622 in accordance with the present disclosure is shown in FIGS. 13-17. The turbine shroud segment 622 is substantially similar to the turbine shroud segment 22 shown in FIGS. 1-7 and described herein. Accordingly, similar reference numbers in the 600 series indicate features that are common between the turbine shroud segment 22 and the turbine shroud segment 622. The description of the turbine shroud segment 22 is incorporated by reference to apply to the turbine shroud segment 622, except in instances when it conflicts with the specific description and the drawings of the turbine shroud segment 622.

The turbine shroud segment 622 includes a carrier 624, a seal segment 626, and a mount assembly 628 configured to couple the seal segment 626 to the carrier 624 as shown in FIGS. 13-17. The carrier 624 includes an outer wall 654 and support walls 656, 658, 660 that extend radially inward from the outer wall 654. The seal segment 626 includes a runner 670 and forward and aft mount flanges 672, 674 that extend radially outward away from the runner 670. The mount assembly 628 includes a first split-pin fastener 630 and a second split-pin fastener 632 that cooperate to couple the mount flanges 672, 674 of the seal segment 626 with the support walls 656, 658, 660 of the carrier 624 to support the seal segment 626 radially relative to the axis 11 of the gas turbine engine 10.

Each of the split-pin fasteners 630, 632 is made up of a forward pin 642, 646, an aft pin 644, 648, and a connector 649 as shown in FIGS. 14-17. The forward and aft pins 642, 644, 646, 648 each extend axially through the seal segment 626 into the carrier 624. The aft pin 644, 648 is circumferentially aligned with and aft of the forward pin 642, 646. The connector 649 extends between and interconnects the forward and aft pins 642, 644, 646, 648 so that the forward and aft pins 642, 644, 646, 648 may be simultaneously installed.

After the first and second split-pin fasteners 630, 632 are installed, the connector 649 is configured to separate so that the forward and aft pins 630, 632 become separate independent pins. The connector 649 aids installation of the first and second split-pin fasteners 630, 632, but the connector 649 is configured to break or split during use of the turbine shroud assembly 222 of the gas turbine engine 10 to allow for independent loading.

The forward pin 642, 646 extends axially through the forward mount flange 672 of the seal segment 626 into the forward support wall 656 and the central support wall 660 of the carrier 624. One end 680 of the forward pin 642, 646 extends into an axially-extending blind support hole 664 of the forward support wall 656, while the other end 681 of the forward pin 642, 646 extends into a forward support hole 668A formed in the central support wall 660.

The aft pin 644, 648 extends axially through the aft mount flange 674 of the seal segment 626 into the aft support wall 658 and the central support wall 660 of the carrier 624. One end 682 of the aft pin 644, 648 extends into an aft support hole 668B of the central support wall 660, while the other end 683 of the aft pin 644, 648 extends in an axially-extending installation aperture 666 of the aft support wall 658.

Figure 14:
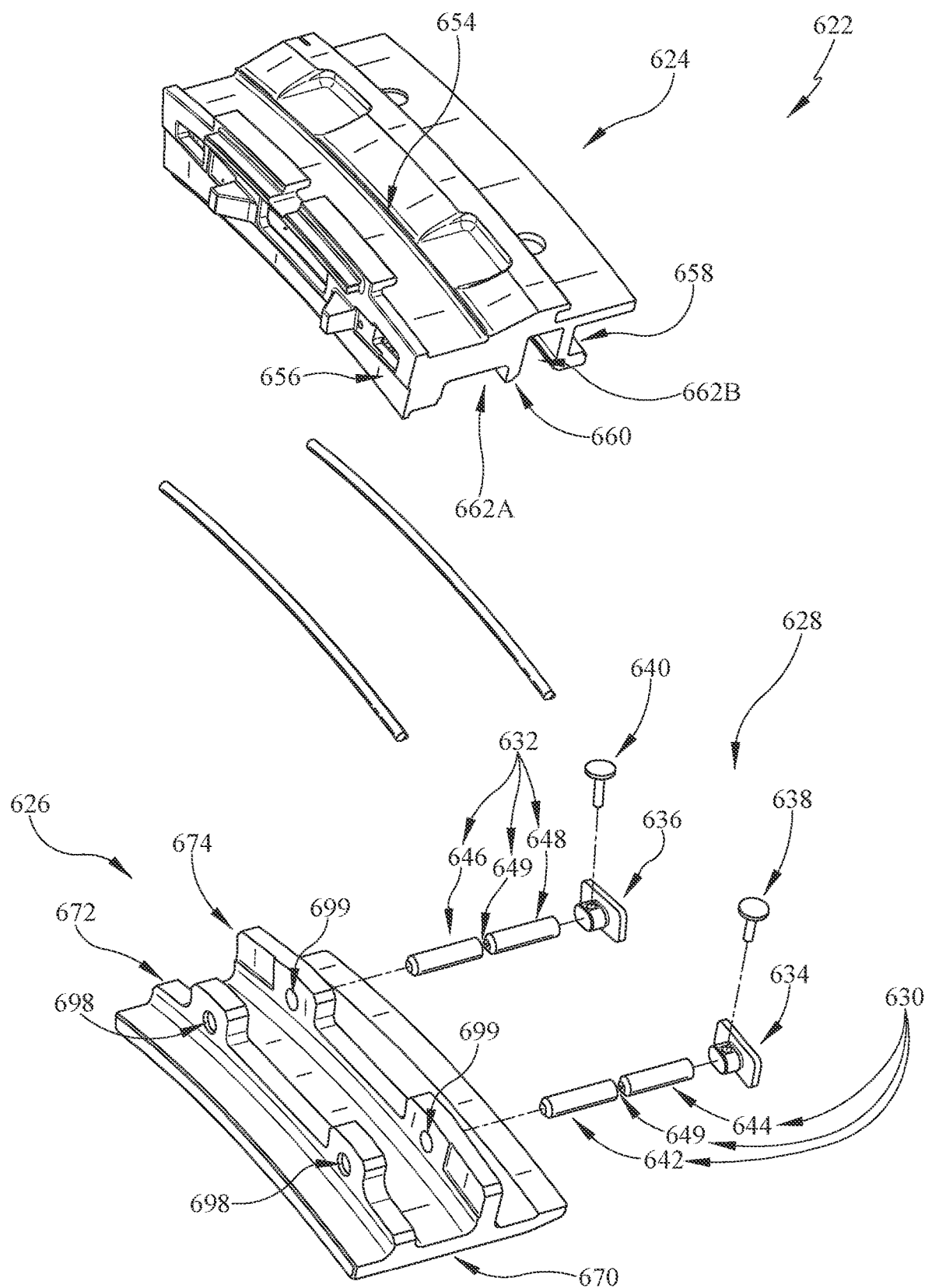
FIG. 14 is an exploded view of the turbine shroud assembly of FIG. 13 showing, from top to bottom, the carrier, the mounting assembly including first and second split-pin fasteners that have forward and aft pins connected by a connector, and first and second retainer plugs configured to block removal of the corresponding split-pin fastener, and the seal segment.
Figure 15:
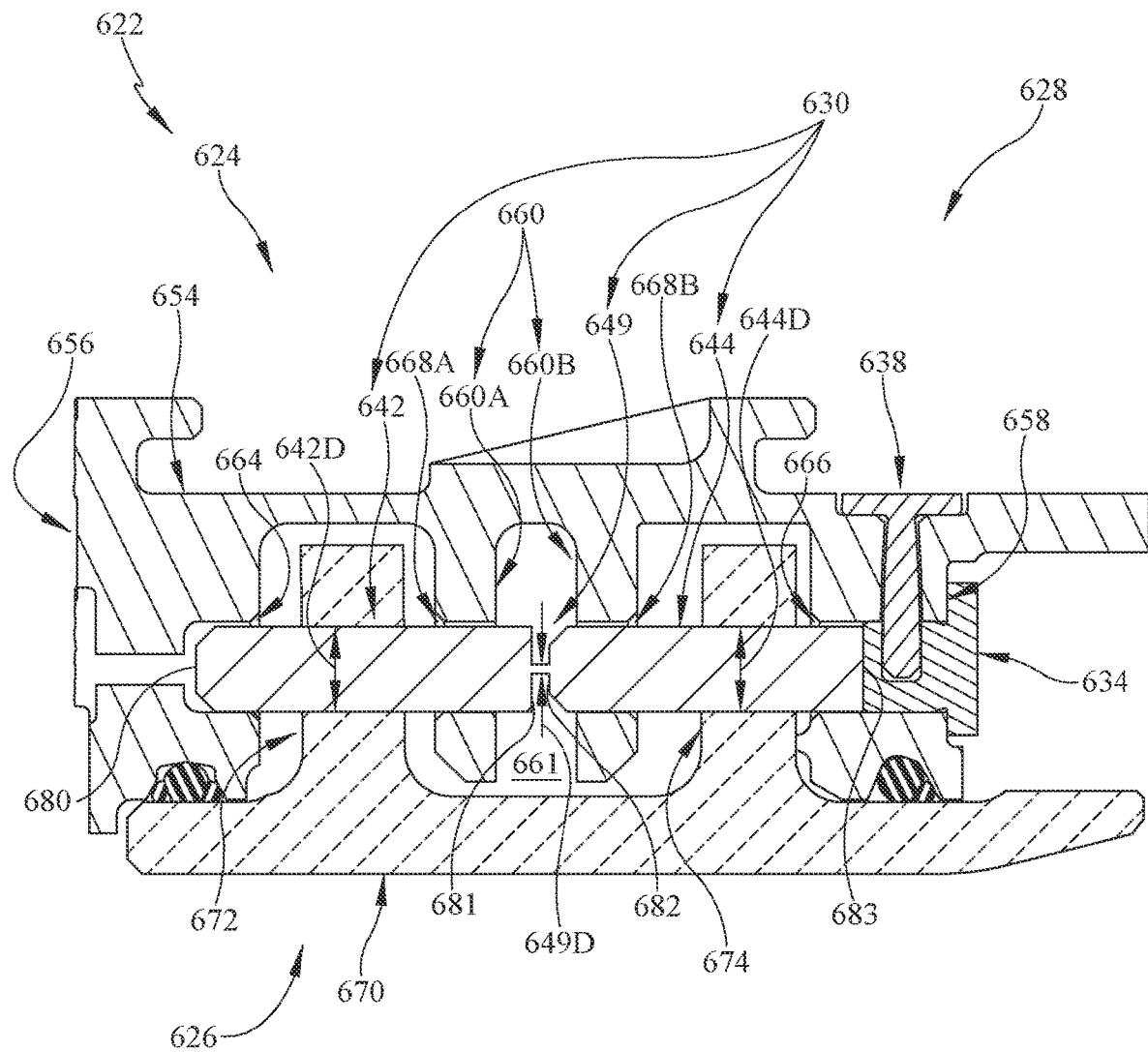
FIG. 15 a detail cross-sectional view of the turbine assembly of FIG. 11 taken along line 15-15 showing the split-pin fastener includes the forward pin, the aft pin, and the connector that extends between and interconnects the forward and aft pins and is configured to separate during use of the gas turbine engine.

The connector 649 extends between and interconnects the second end 481 of the forward pin 642, 646 and the first end 482 of the aft pin 644, 648 as shown in FIGS. 14 and 15. In the illustrative embodiment, the connector 649 extends between the second end 681 of the forward pin 642, 646 and the first end 682 of the aft pin 644, 646 in a gap 661 between forward and aft support plates 660A, 660B of the central support wall 660.

Figure 16:
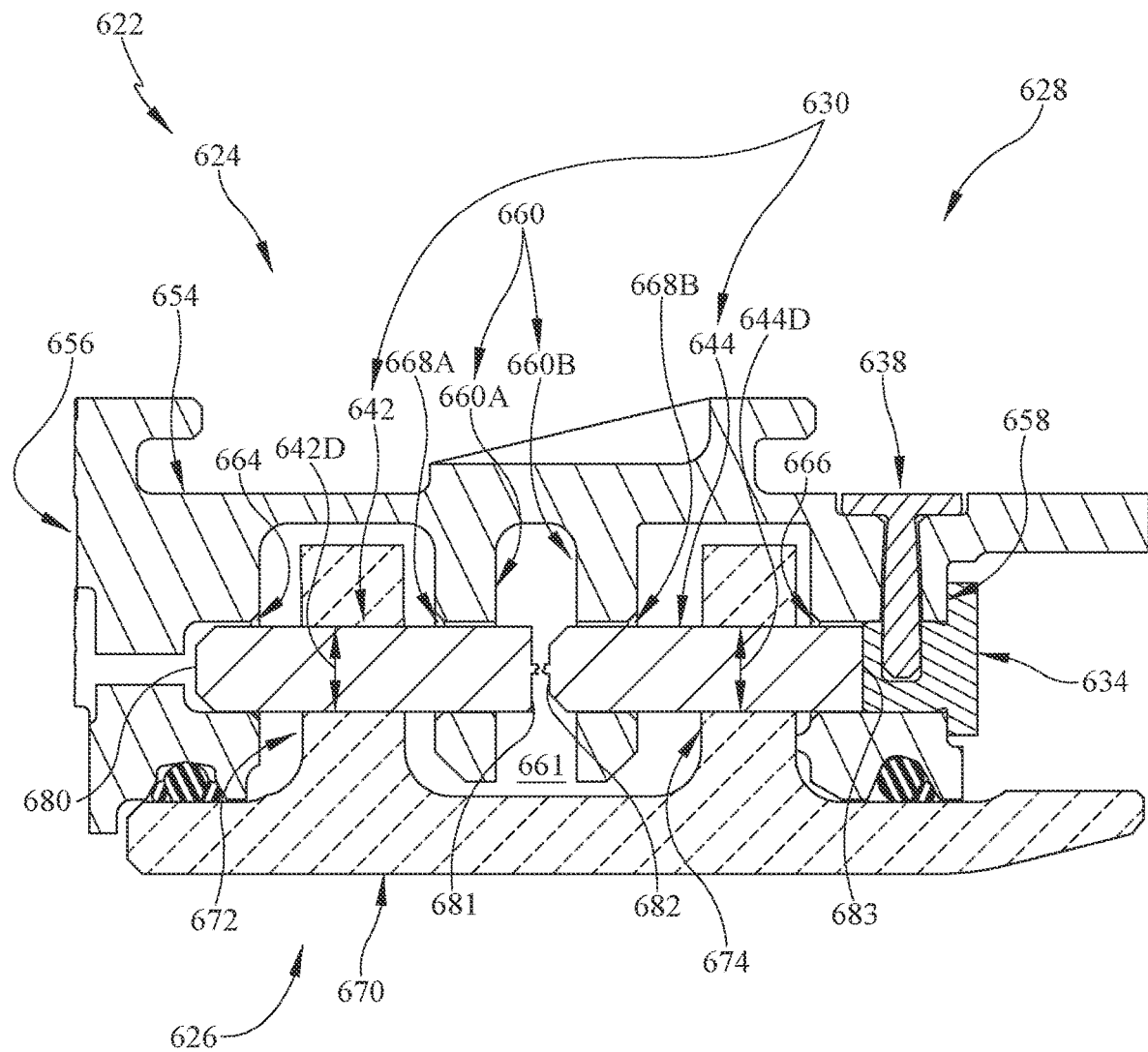
FIG. 16 is a view similar to FIG. 15 showing the connector of the split-pin fastener separated such that the forward and aft pins are independent from each other.

In the illustrative embodiment, the forward pin 642, 646 has a first diameter 642D and the aft pin 644, 648 has a second diameter 644D as shown in FIGS. 15 and 16. The connector 649 has a third diameter 649D that is less than the first and second diameters 642D, 644D of the forward and aft pins 642, 644, 646, 648. The smaller diameter 649D of the connector 649 creates a weak point or a predetermined break point in the split-pin fastener 630, 632. During use in the gas turbine engine 10, stress in the connector 649 causes the connector 649 to break, separating the split-pin fastener 630, 632 into the forward and aft pins 642, 644, 646, 648 as shown in FIG. 16.

A method of assembling the turbine shroud segment 622 may include steps. To begin, the seal segment 626 is located adjacent to the carrier 624. The seal segment 626 is located adjacent to the carrier 624 so that the forward and aft mount flanges 672, 674 extend into the corresponding cavities 662A, 662B in the carrier 624. Each of the forward and aft mount flanges 672, 674 are inserted into the corresponding cavities 662A, 662B such that pin holes 698, 699 in the mount flanges 672, 674 align with the blind support holes 664, the installation apertures 666, and the support holes 668A, 668B.

The split-pin fasteners 630, 632 may then be inserted into the carrier 624 and through the forward and aft mount flanges 672, 674 of the seal segment 626. The first split-pin fastener 630 is inserted through the first installation aperture 666 so that the first split-pin fastener 630 extends through the aft mount flange 674, the central support wall 660, and the forward mount flange 672 into the first blind support hole 64. The second split-pin fastener 632 is inserted through the second installation aperture (not shown) so that the second split-pin fastener 632 extends through the aft mount flange 674, the central support wall 660, and the forward mount flange 672 into the second blind support hole (not shown).

The connector 649 allows the forward and aft pins 642, 644, 646, 648 of each split-pin fasteners 630, 632 to be inserted simultaneously. Once the split-pin fastener 630, 632 is inserted, a corresponding retainer plug 634, 636 may be inserted into the installation aperture 666. A corresponding retainer pin 638, 640 may then inserted radially into the carrier 624 to block removal of the corresponding retainer plug 634, 636.

During use of the gas turbine engine 10, stress in the connector 649 causes the connector 649 to break, separating the split-pin fastener 630, 632 into the forward and aft pins 642, 644, 646, 648 as shown in FIG. 16. The separate pins 642, 644, 646, 648 may independently loaded.

To disassemble the turbine shroud segment 622, the retainer pins 638, 640 are removed first. This allows the each of the retainer plugs 634, 636 to be removed from the installation apertures 666 as shown in FIG. 17.

Figure 17:
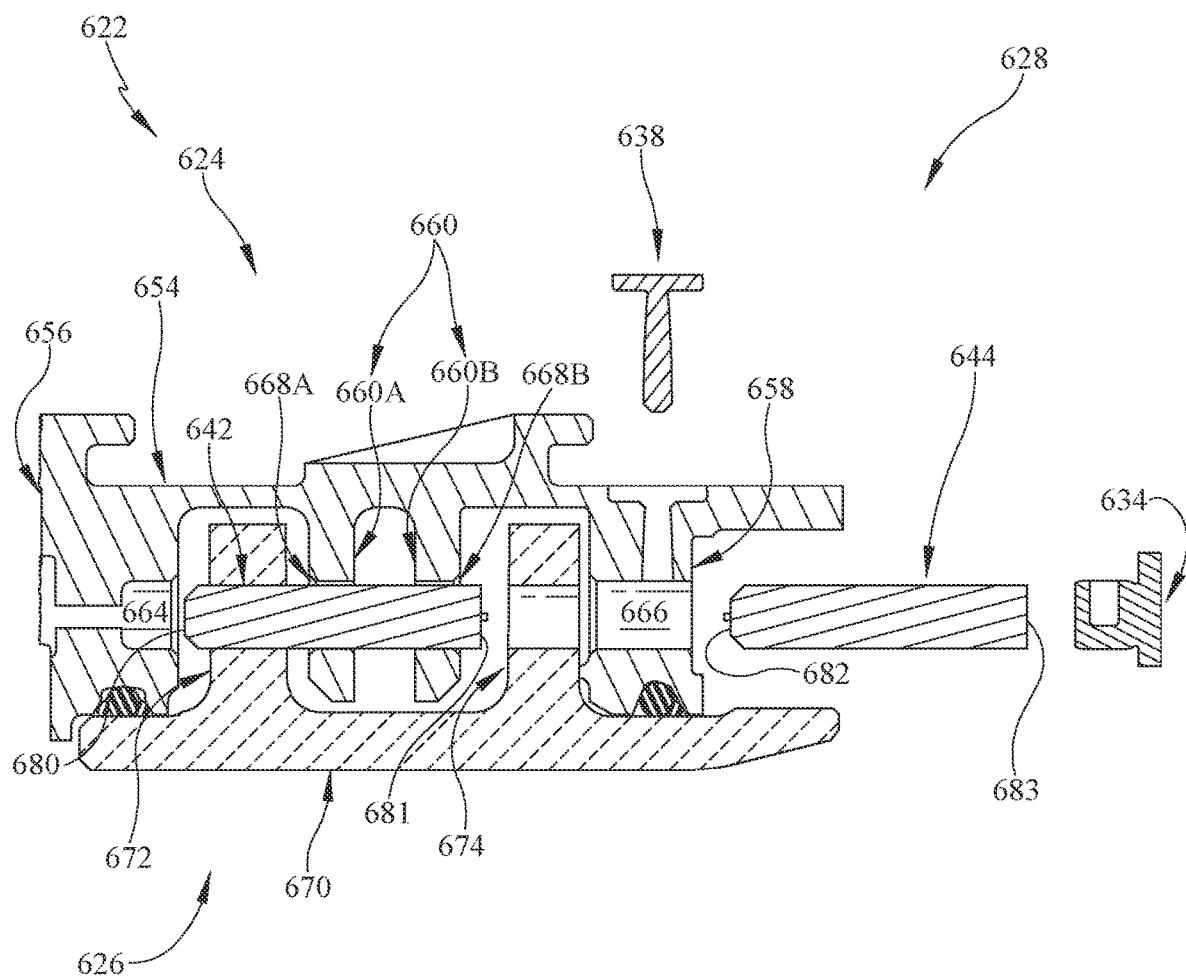
FIG. 17 is an exploded view of FIG. 13 showing the aft pin of the split-pin fastener is now independent of the forward pin such that the aft pin is moved axially aft out of the carrier.

Since the split-pin fasteners 630, 632 are separated into the forward and aft pins 642, 644, 646, 648, the aft pin 644, 648 may then be removed out through the installation aperture 666 like as shown in FIG. 17. In the illustrative embodiment, the forward support wall 656 includes push out holes 665 that extends axially into the forward support wall 656 and opens into the corresponding blind hole 664. A removal tool (not shown) may be inserted through the push out hole 665 to push the forward and aft pins 642, 644, 646, 648 of each split-pin fastener 630, 632 out through the installation aperture 666.

Figure 18:
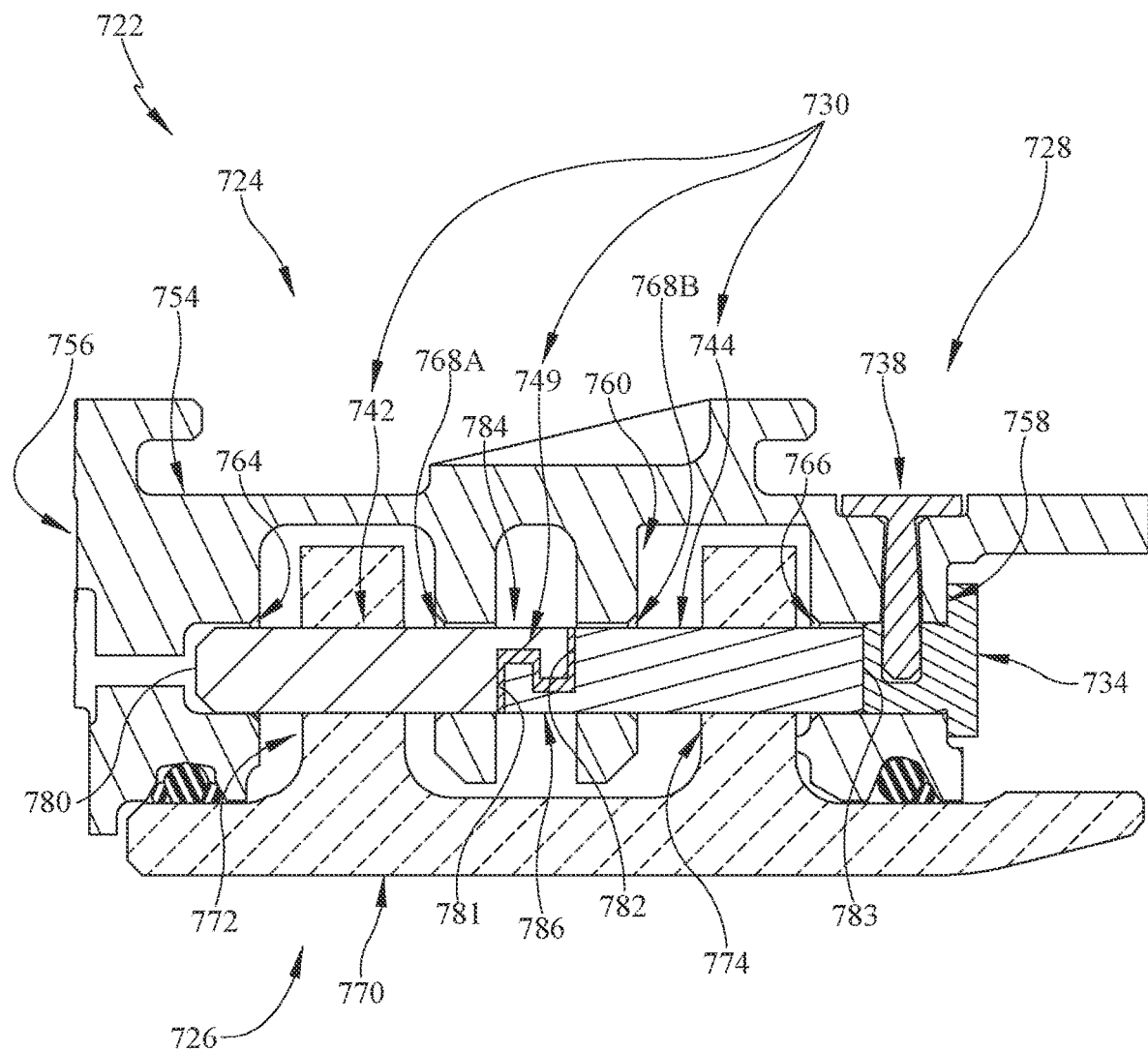
FIG. 18 is a detail cross-sectional view of another turbine shroud assembly like the turbine shroud assembly in FIGS. 13-17 showing the forward and aft pins include interlocking hooks and the connector is located between the interlocking hooks and configured to burn away during use of the gas turbine engine.
Figure 19:
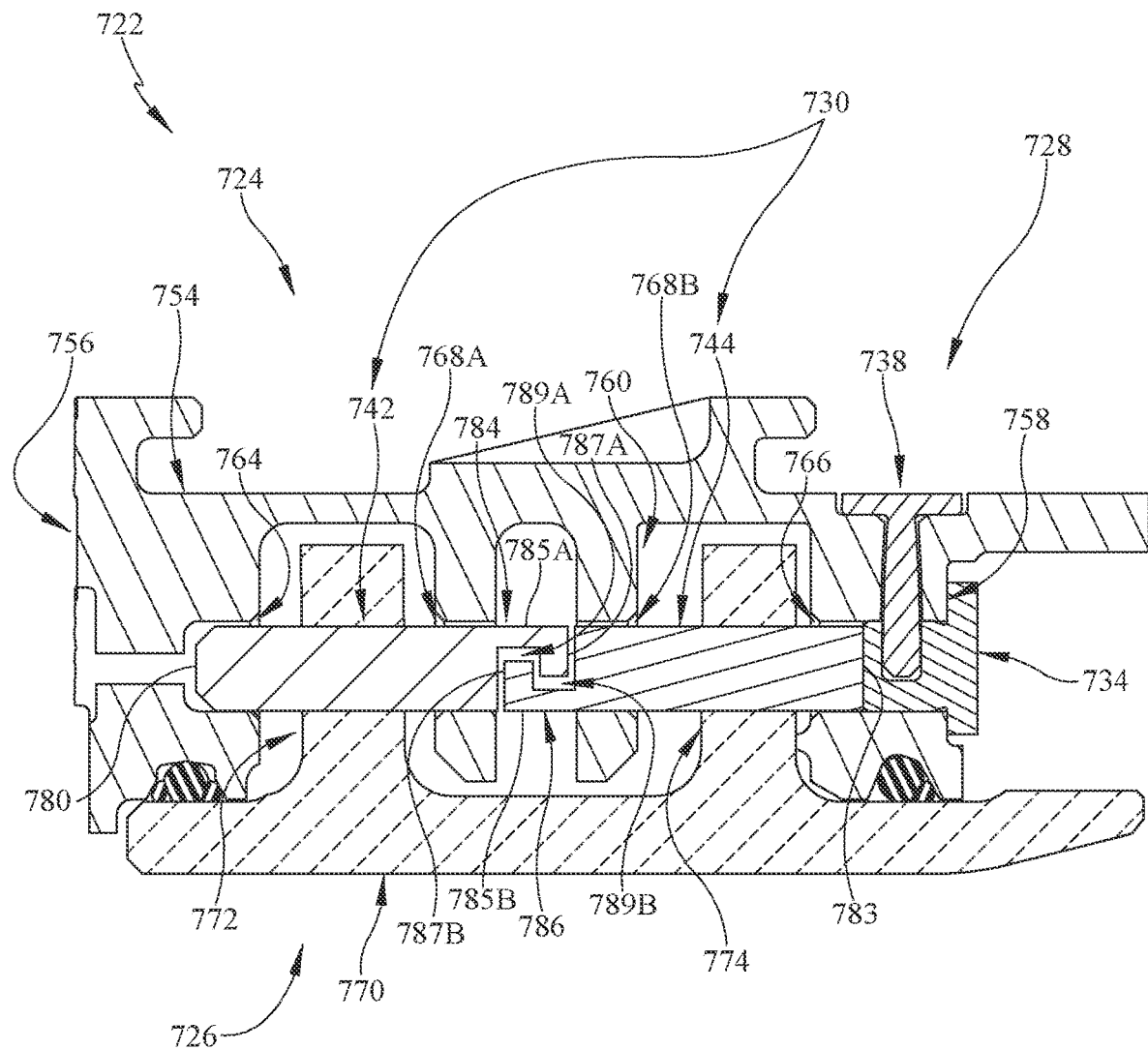
FIG. 19 is view similar to FIG. 16 showing the connector of the split-pin fastener burned away such that the forward and aft pins are independent from each other.

Another embodiment of a turbine shroud segment 722 in accordance with the present disclosure is shown in FIGS. 18 and 19. The turbine shroud segment 722 is substantially similar to the turbine shroud segment 22 shown in FIGS. 1-7 and described herein. Accordingly, similar reference numbers in the 700 series indicate features that are common between the turbine shroud segment 22 and the turbine shroud segment 722. The description of the turbine shroud segment 22 is incorporated by reference to apply to the turbine shroud segment 722, except in instances when it conflicts with the specific description and the drawings of the turbine shroud segment 722.

The turbine shroud segment 722 includes a carrier 724, a seal segment 726, and a mount assembly 728 configured to couple the seal segment 726 to the carrier 724 as shown in FIGS. 18 and 19. The carrier 724 includes an outer wall 754 and support walls 756, 758, 760 that extend radially inward from the outer wall 754. The seal segment 726 includes a runner 770 and forward and aft mount flanges 772, 774 that extend radially outward away from the runner 770. The mount assembly 728 includes a first split-pin fastener 730 and a second split-pin fastener 732 that cooperate to couple the mount flanges 772, 774 of the seal segment 726 with the support walls 756, 758, 760 of the carrier 724 to support the seal segment 726 radially relative to the axis 11 of the gas turbine engine 10.

Each of the split-pin fasteners 730 is made up of a forward pin 742, an aft pin 744, and a connector 749 as shown in FIGS. 18 and 19. The forward and aft pins 742, 744 each extend axially through the seal segment 726 into the carrier 724. The aft pin 744 is circumferentially aligned with and aft of the forward pin 742. The connector 749 extends between and interconnects the forward and aft pins 742, 744 so that the forward and aft pins 742, 744 may be simultaneously installed.

After the first and second split-pin fasteners 730 are installed, the connector 749 is configured to separate so that the forward and aft pins 742, 744 become separate independent pins. The connector 749 aids installation of the first and second split-pin fasteners 730 but the connector 749 is configured to burn away during use of the turbine shroud assembly 722 of the gas turbine engine 10 to allow for independent loading of the forward and aft pins 742, 744. In the illustrative embodiment, the connector 749 an adhesive, such as glue, that is configured to burn away during use of the gas turbine engine 10.

The forward pin 742 extends axially through the forward mount flange 772 of the seal segment 726 into the forward support wall 756 and the central support wall 760 of the carrier 724. One end 780 of the forward pin 742 extends into an axially-extending blind support hole 764 of the forward support wall 756, while the other end 781 of the forward pin 742 extends into a forward support hole 768A formed in the central support wall 760.

The aft pin 744 extends axially through the aft mount flange 774 of the seal segment 726 into the aft support wall 758 and the central support wall 760 of the carrier 724. One end 782 of the aft pin 744 extends into an aft support hole 768B of the central support wall 760, while the other end 783 of the aft pin 744 extends in an axially-extending installation aperture 766 of the aft support wall 758.

The connector 749 extends between and interconnects the second end 481 of the forward pin 742 and the first end 482 of the aft pin 744 as shown in FIG. 18. In the illustrative embodiment, the end 781 of the forward pin 742 and the end 282 of the aft pin 744 are interlocked hooks 784, 786 as shown in FIGS. 18 and 19.

Each hook 784 includes an axially-extending portion 785A, 785B and a radially-extending portion 787A, 787B as shown in FIGS. 18 and 19. The axially-extending portion 785A, 785B extends axially from the corresponding end 781, 782 of the respective pin 742, 744. The radially-extending portion 787A, 787B extends radially inward from the axially-extending portion 785A, 785B to define a channel 789A, 789B and forms the hook shape.

The hook 784 of the forward pin 742 and the hook 786 of the aft pin 744 are configured to interlock with each other. In the illustrative embodiment, the connector 749 is located between the hooks 784, 786. Once the connector 749 burns away, the hooks 784, 786 interlock but still allows for movement relative to each other so that the pins 742, 744 may act independently.

In some embodiments, the split-pin fasteners 730 are installed without the connector 749. The hooks 784, 786 interlock to allow the forward and aft pins 742, 744 simultaneously, but still allows for movement relative to each other so that the pins 742, 744 may act independently.

Additionally, the interlocked hooks 784, 786 aid in removal of the split-pin fasteners 730. The pins 742, 744 remain interlocked so that removal of the aft pin 744 causes the forward pin 742 to be removed as well.

A method of assembling the turbine shroud segment 722 may include steps. To begin, the seal segment 726 is located adjacent to the carrier 724. The seal segment 726 is located adjacent to the carrier 724 so that the forward and aft mount flanges 772, 774 extend into corresponding cavities 762A, 762B in the carrier 724. Each of the forward and aft mount flanges 772, 774 are inserted into the corresponding cavities 762A, 762B such that pin holes 798, 799 in the mount flanges 772, 774 align with the blind support holes 764, the installation apertures 766, and the support holes 768A, 768B.

The split-pin fasteners 730 may then be inserted into the carrier 724 and through the forward and aft mount flanges 772, 774 of the seal segment 726. The first split-pin fastener 730 is inserted through the first installation aperture 766 so that the first split-pin fastener 730 extends through the aft mount flange 774, the central support wall 760, and the forward mount flange 772 into the first blind support hole 764. The second split-pin fastener is inserted through the second installation aperture (not shown) so that the second split-pin fastener extends through the aft mount flange 774, the central support wall 760, and the forward mount flange 772 into the second blind support hole (not shown).

The connector 749 allows the forward and aft pins 742, 744 of each split-pin fasteners 730 to be inserted simultaneously. Once the split-pin fastener 730 is inserted, a corresponding retainer plug 734 may be inserted into the installation aperture 766. A corresponding retainer pin 738 may then inserted radially into the carrier 724 to block removal of the corresponding retainer plug 734.

During use of the gas turbine engine 10, the high temperature in the engine 10 causes the connector 749 to burn away, separating the split-pin fastener 730 into the forward and aft pins 742, 744 as shown in FIG. 19. The separate pins 742, 744 remain interlocked but are able to move relative to each other so that may the forward and aft pins 742, 744 may be independently loaded.

To disassemble the turbine shroud segment 722, the retainer pins 738 are removed first. This allows the each of the retainer plugs 734 to be removed from the installation apertures 766.

Since the forward and aft pins 742, 744 are interlocked by the hooks 784, 786, the split-pin fasteners 730 may then be removed out through the installation aperture 766. The removal of the aft pin 744 causes the removal of the forward pin 742.

Figure 20:
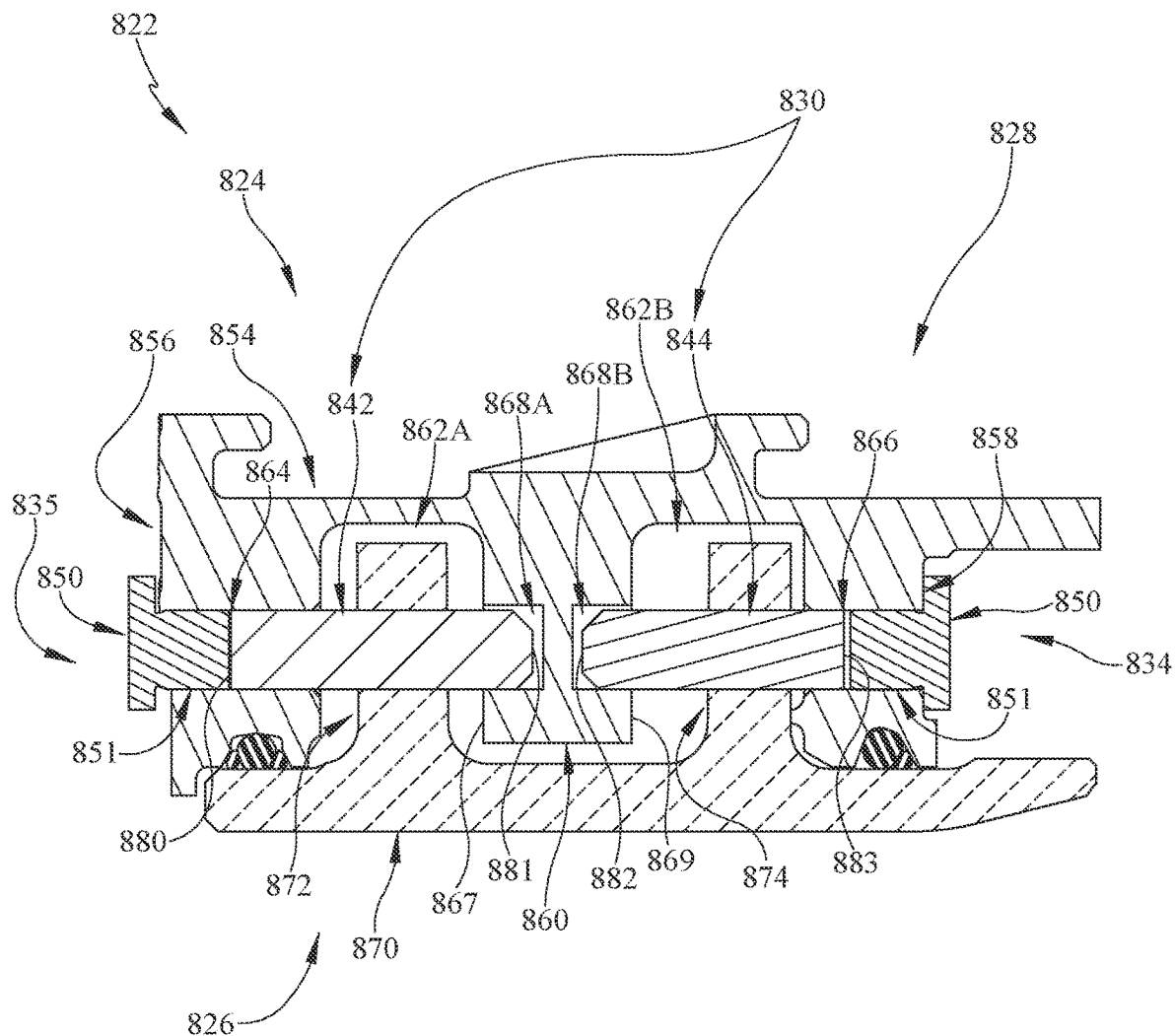
FIG. 20 is a detail cross-sectional view of another turbine shroud assembly adapted for use in the gas turbine engine of FIG. 1 showing the mounting assembly includes forward and aft pins that are inserted through opposite sides of the carrier.

Another embodiment of a turbine shroud segment 822 in accordance with the present disclosure is shown in FIG. 20. The turbine shroud segment 822 is substantially similar to the turbine shroud segment 22 shown in FIGS. 1-7 and described herein. Accordingly, similar reference numbers in the 800 series indicate features that are common between the turbine shroud segment 22 and the turbine shroud segment 822. The description of the turbine shroud segment 22 is incorporated by reference to apply to the turbine shroud segment 822, except in instances when it conflicts with the specific description and the drawings of the turbine shroud segment 822.

The turbine shroud segment 822 includes a carrier 824, a seal segment 826, and a mount assembly 828 configured to couple the seal segment 826 to the carrier 824 as shown in FIG. 20. The carrier 824 includes an outer wall 854 and support walls 856, 858, 860 that extend radially inward from the outer wall 854. The seal segment 826 includes a runner 870 and forward and aft mount flanges 872, 874 that extend radially outward away from the runner 870. The mount assembly 828 includes a first split-pin fastener 830 and a second split-pin fastener (not shown) that cooperate to couple the mount flanges 872, 874 of the seal segment 826 with the support walls 856, 858, 860 of the carrier 824 to support the seal segment 826 radially relative to the axis 11 of the gas turbine engine 10.

Each of the split-pin fasteners 830 is made up of a forward pin 842, and an aft pin 844 as shown in FIG. 20. The forward and aft pins 842, 844 each extend axially through the seal segment 826 into the carrier 824.

The carrier 824 includes the outer wall 854, a forward support wall 856, an aft support wall 858, and a central support wall 860 as shown in FIG. 20. The outer wall 854 extends circumferentially at least partway about the axis 11. The forward, aft, and central support walls 856, 858, 860 each extends radially inward from the outer wall 854. The aft support wall 858 is spaced axially from the forward support wall 856. The central support wall 860 is located axially between the forward support wall 856 and the aft support wall 858 to form cavities 862A, 862B.

The forward support wall 56 is shaped to include forward axially-extending installation apertures 864 as shown in FIG. 20. The first forward axially-extending installation aperture 864 receives a portion of the forward pin 842 of the first split-pin fastener 830. The second forward axially-extending installation aperture (not shown) is spaced apart circumferentially from the first forward axially-extending installation aperture 864 and receives a portion of the forward pin (not shown) of the second split-pin fastener.

Similarly, the aft support wall 58 is shaped to include axially-extending installation apertures 866 as shown in FIG. 20. The first axially-extending installation aperture 866 receives a portion of the aft pin 844 of the first split-pin fastener 530. The second axially-extending installation aperture (not shown) is spaced apart circumferentially from the first axially-extending installation aperture 866 and receives a portion of the aft pin (not shown) of the second split-pin fastener.

The central support wall 860 is shaped to include blind support holes 868A, 868B as shown in FIG. 20. The first support holes 868A, 868B receive the forward and aft pins 842, 844 of the first split-pin fastener 830. The second support holes (not shown) are spaced apart circumferentially from the first support holes 868A, 868B and receive the second split-pin fastener.

The forward blind support holes 868A extend axially into a forward surface 867 of the central support wall 860, while the aft blind support holes 868B extend axially into an aft surface 869 as shown in FIG. 20. The blind support holes 868A, 868B are aligned with the corresponding axially-extending installation apertures 864, 866 to receive the forward and aft pins 842, 844.

The forward pin 842 extends through the forward installation aperture 864 and the forward mount flange 872 into the forward blind support hole 868A. One end 880 of the forward pin 842 extends into the installation aperture 864 of the forward support wall 856 while the other end 881 of the forward pin 842 extends into the forward support hole 868A of the central support wall 860.

The aft pin 844 extends through the aft installation aperture 866 and the aft mount flange 874 into the aft blind support hole 868B. One end 882 of the aft pin 844 extends into the aft support hole 868B of the central support wall 860, while the other end 883 of the aft pin 844 extends into the installation aperture 866 of the aft support wall 858.

The second end 881 of the forward pin 842 is in confronting relation with the first end 882 of the aft pin 844 while remaining separate from the aft pin 844 so as to allow for independent loading during use in the gas turbine engine 10. Unlike the embodiment of FIGS. 1-7, the central support wall 860 extends between the forward and aft pins 842, 844 such that the forward pin 842 does not directly confront the aft pin 844.

In the illustrative embodiment, the mount assembly 828 further includes retainer plugs 834, 835 as shown in FIG. 20. The retainer plugs 834, 835 are configured to block removal of the forward and aft pins 842, 844 out through the installation apertures 864, 866. The retainer plugs 834, 835 extend into the carrier 824 and engage the corresponding pin 842, 844 to block removal of the forward and aft pins 842, 844.

The forward retainer plug 834 extends into the forward installation aperture 864 as shown in FIG. 20. The forward retainer plug 834 blocks removal of the forward pin 842 out of the carrier 824 through the forward installation aperture 864.

The aft retainer plug 835 extends into the aft installation aperture 866 as shown in FIG. 20. The aft retainer plug 835 blocks removal of the aft pin 844 out of the carrier 824 through the aft installation aperture 866.

Each of the retainer plugs 834, 835 is shaped to include a head 850 and a shaft 851 as shown in FIG. 20. The head 850 engages the carrier 824 to locate the retainer plug 834 relative to the split-pin fastener 830. The shaft 851 extends axially from the head 850. The shaft 851 engages the forward or aft pin 842, 844 to block removal of the pins 842, 844.

A method of assembling the turbine shroud segment 822 may include steps. To begin, the seal segment 826 is located adjacent to the carrier 824. The seal segment 826 is located adjacent to the carrier 824 so that the forward and aft mount flanges 872, 874 extend into the corresponding cavities 862A, 862B in the carrier 824. Each of the forward and aft mount flanges 872, 874 are inserted into the corresponding cavities 862A, 862B such that pin holes (not shown) in the mount flanges 872, 874 align with the installation apertures 864, 866, and the blind support holes 868A, 868B.

The split-pin fasteners 830 may then be assembled to couple the seal segment 826 to the carrier 824. The forward pin 842 of the first split-pin fastener 830 is inserted axially aft through the forward installation aperture 864 and the forward mount flange 872 into the forward blind support hole 868A. The aft pin 844 of the first split-pin fastener 830 is inserted axially forward through the forward installation aperture 864 and the forward mount flange 872 into the aft blind support hole 868B. The same is done for the forward and aft pins of the second split-pin fastener.

Once the forward and aft pins 842, 844 are inserted, the corresponding retainer plug 834, 835 is inserted into the corresponding installation aperture 864, 866. The forward retainer plug 834 is inserted into the forward installation aperture 864 so that the head 850 of the retainer plug 834 engages the forward support wall 856. The aft retainer plug 835 is inserted into the forward installation aperture 866 so that the head 850 of the retainer plug 835 engages the aft support wall 858.

To disassemble the turbine shroud segment 822, retainer plugs 834, 835 are removed from the installation apertures 864, 866. The forward and aft pins 842, 844 may then be removed from either side of the carrier 824.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use with a gas turbine engine, the shroud assembly comprising
   a carrier shaped to include an outer wall, a forward support wall, an aft support wall spaced axially from the forward support wall, and a central support wall located between the forward support wall and the aft support,
   a seal segment comprising ceramic matrix composite materials, the seal segment shaped to include a runner that extends circumferentially partway around an axis, a forward mount flange that extends from the runner into a forward space between the forward support wall and the central support wall of the carrier, and an aft mount flange that extends from the runner into an aft space between the aft support wall and the central support wall of the carrier, and
   a mount assembly including a forward pin that extends axially through the forward mount flange of the seal segment into both the forward support wall and the central support wall of the carrier and an aft pin circumferentially aligned with and aft of the forward pin that extends axially through the aft mount flange of the seal segment into both the aft support wall and the central support wall of the carrier, the forward pin and the aft pin are spaced axially apart from one another by at least a portion of the central support wall and separate from each other so as to allow for independent movement of the forward pin and the aft pin.

2. The shroud assembly of claim 1, wherein the forward support wall is formed to include a forward axially-extending installation aperture that receives a portion of the forward pin and the aft support wall is formed to include an aft axially-extending installation aperture that receives a portion of the aft pin.

3. The shroud assembly of claim 2, wherein the mount assembly includes a forward retainer plug configured to block removal of the forward pin through the forward axially-extending installation aperture and an aft retainer plug configured to block removal of the aft pin through the aft axially-extending installation aperture.

4. The shroud assembly of claim 3, wherein the central support wall is formed to include a forward blind support hole that receives another portion of the forward pin and an aft blind support hole that receives another portion of the aft pin.

5. The shroud assembly of claim 2, wherein the central support wall is formed to include a forward blind support hole that receives another portion of the forward pin and an aft blind support hole that receives another portion of the aft pin.

6. The shroud assembly of claim 1, wherein the mount assembly includes a forward retainer plug configured to block removal of the forward pin out of the carrier and an aft retainer plug configured to block removal of the aft pin out of the carrier.

7. A turbine shroud assembly adapted for use with a gas turbine engine, the shroud assembly comprising
a carrier shaped to include an outer wall, a forward support wall, an aft support wall spaced axially from the forward support wall, and a central support wall located between the forward support wall and the aft support,
a seal segment shaped to include a runner that extends circumferentially partway around an axis, a forward mount flange that extends from the runner into a forward space between the forward support wall and the central support wall of the carrier, and an aft mount flange that extends from the runner into an aft space between the aft support wall and the central support wall of the carrier, and
a mount assembly including a forward pin that extends axially through the forward mount flange of the seal segment into both the forward support wall and the central support wall of the carrier and an aft pin that extends axially through the aft mount flange of the seal segment into both the aft support wall and the central support wall of the carrier.

8. The shroud assembly of claim 7, wherein the forward pin and the aft pin are spaced axially apart from one another by at least a portion of the central support wall.

9. The shroud assembly of claim 7, wherein the forward pin is located forward of the aft pin at the same circumferential and radial location relative to the axis so as to provide a split-pin assembly that extends through both the forward mount flange and the aft mount flange of the seal segment.

10. The shroud assembly of claim 7, wherein the forward support wall is formed to include a forward axially-extending installation aperture that receives a portion of the forward pin and the aft support wall is formed to include an aft axially-extending installation aperture that receives a portion of the aft pin.

11. The shroud assembly of claim 10, wherein the mount assembly includes a forward retainer plug configured to block removal of the forward pin through the forward axially-extending installation aperture and an aft retainer plug configured to block removal of the aft pin through the aft axially-extending installation aperture.

12. The shroud assembly of claim 11, wherein the central support wall is formed to include a forward blind support hole that receives another portion of the forward pin and an aft blind support hole that receives another portion of the aft pin.

13. The shroud assembly of claim 10, wherein the central support wall is formed to include a forward blind support hole that receives another portion of the forward pin and an aft blind support hole that receives another portion of the aft pin.

14. The shroud assembly of claim 7, wherein the mount assembly includes a forward retainer plug configured to block removal of the forward pin out of the carrier and an aft retainer plug configured to block removal of the aft pin out of the carrier.

15. A method comprising
providing a carrier, a seal segment, and a mount assembly, the carrier including an outer wall that extends circumferentially at least partway about an axis, a forward support wall that extends radially inward from the outer wall, an aft support wall spaced axially from the forward support wall that extends radially inwardly from the outer wall, and a central support wall located axially between the forward support wall and the aft support wall that extends radially inwardly from the outer wall, the seal segment including a runner that extends circumferentially partway around an axis, a forward mount flange that extends radially outward from the runner, and an aft mount flange that extends radially outward from the runner, and the mount assembly including a forward pin and an aft pin,
locating the seal segment adjacent to the carrier so that the forward mount flange is between the forward support wall and the central support wall of the carrier and the aft mount flange is between the aft support wall and the central support wall of the carrier, and
coupling the seal segment with the carrier with the first split-pin fastener by inserting the forward pin of the first split-pin fastener through the forward support wall of the carrier and the forward mount flange of the seal segment into the central support wall of the carrier and inserting the aft pin of the first split-pin fastener through the aft support wall of the carrier and the aft mount flange of the seal segment into the central support wall of the carrier.

16. The shroud assembly of claim 15, wherein the forward pin and the aft pin are spaced axially apart from one another by at least a portion of the central support wall.

17. The shroud assembly of claim 15, wherein the forward support wall is formed to include a forward axially-extending installation aperture that receives a portion of the forward pin and the aft support wall is formed to include an aft axially-extending installation aperture that receives a portion of the aft pin.

18. The shroud assembly of claim 17, wherein the mount assembly includes a forward retainer plug and an aft retainer plug and the method further comprises inserting the forward retainer plug into the forward axially-extending installation aperture to block removal of the forward pin and inserting the aft retainer plug into the aft axially-extending installation aperture to block removal of the aft pin.

19. The shroud assembly of claim 18, wherein the central support wall is formed to include a forward blind support hole that receives another portion of the forward pin and an aft blind support hole that receives another portion of the aft pin.

20. The shroud assembly of claim 15, wherein the mount assembly includes a forward retainer plug and an aft retainer plug and the method further comprises inserting the forward retainer plug into the forward support wall of the carrier to block removal of the forward pin and inserting the aft retainer plug into the aft support wall to block removal of the aft pin.

\* \* \* \* \*